United States Patent [19]
Shimada et al.

[11] Patent Number: 5,814,972
[45] Date of Patent: Sep. 29, 1998

[54] ELECTRONIC APPARATUS HAVING MULTIPLE LOADS, DRIVEN BY PLURAL BATTERIES

[75] Inventors: Kazutoshi Shimada, Yokosuka; Eisaku Tatsumi, Yokohama; Shinichi Sunakawa, Kawasaki; Katsuhiko Nagasaki, Ichikawa, all of Japan

[73] Assignee: Canon Kabushiki Kaisha, Tokyo, Japan

[21] Appl. No.: 845,365

[22] Filed: Apr. 24, 1997

Related U.S. Application Data

[63] Continuation of Ser. No. 239,543, May 9, 1994, abandoned.

[30] Foreign Application Priority Data

May 13, 1993 [JP] Japan ................................ 5-135441

[51] Int. Cl.$^6$ .................................................. H01M 10/46
[52] U.S. Cl. .......................................... 320/132; 320/135
[58] Field of Search ................................... 320/5, 6, 7, 13, 320/17, 18, 25, 132, 135

[56] References Cited

U.S. PATENT DOCUMENTS

| | | | |
|---|---|---|---|
| 4,412,137 | 10/1983 | Hansen et al. | 307/10 R |
| 4,413,220 | 11/1983 | Waineo | 320/15 |
| 4,788,452 | 11/1988 | Stanley | 307/71 |
| 4,814,631 | 3/1989 | Jackson | 307/53 |
| 5,121,046 | 6/1992 | McCullough | 320/16 |
| 5,243,269 | 9/1993 | Katayama et al. | 320/14 |
| 5,418,402 | 5/1995 | Fujiwara | 307/10.1 |

FOREIGN PATENT DOCUMENTS

| | | |
|---|---|---|
| 0003152 | 7/1979 | European Pat. Off. . |
| 435317 | 7/1991 | European Pat. Off. . |

*Primary Examiner*—Edward Tso
*Attorney, Agent, or Firm*—Fitzpatrick, Cella, Harper & Scinto

[57] ABSTRACT

An electronic apparatus comprising a plurality of loads, which are separately driven by a plurality of batteries, further comprises a switching device which automatically changes a system of connection between the batteries and the loads in accordance with the conditions of the electronic apparatus. Such conditions of the electronic apparatus include the remaining capacities of the batteries, load changes in the loads, and temperature changes in the electronic apparatus. An electronic apparatus provided with a system clock generating device and a peak load device comprises a system clock controller which suspends the supply of a system clock or divides the system clock while a peak voltage is being generated. A drive controller changes the connection between the first and second batteries in accordance with detected remaining capacities of the first and second batteries.

22 Claims, 21 Drawing Sheets

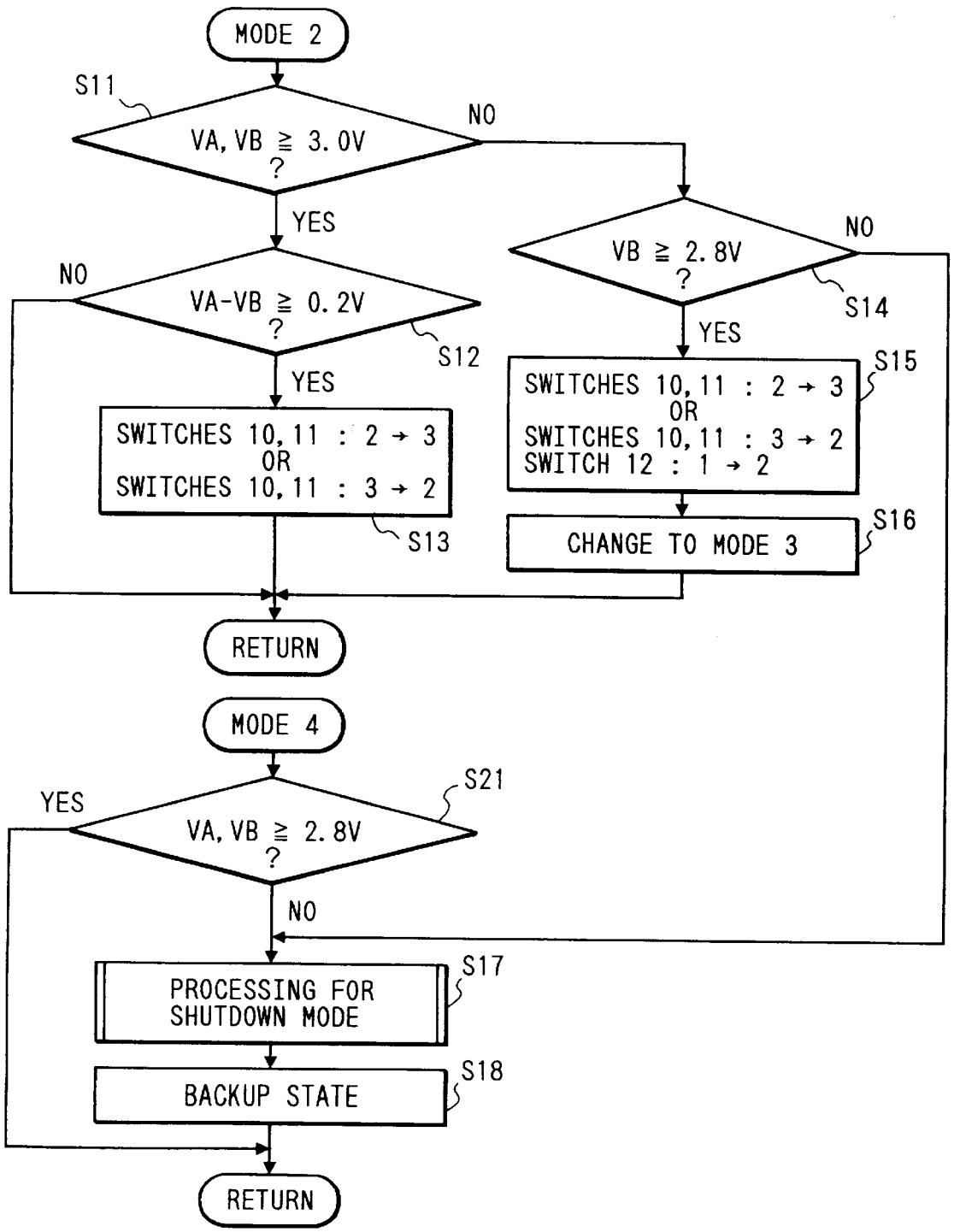

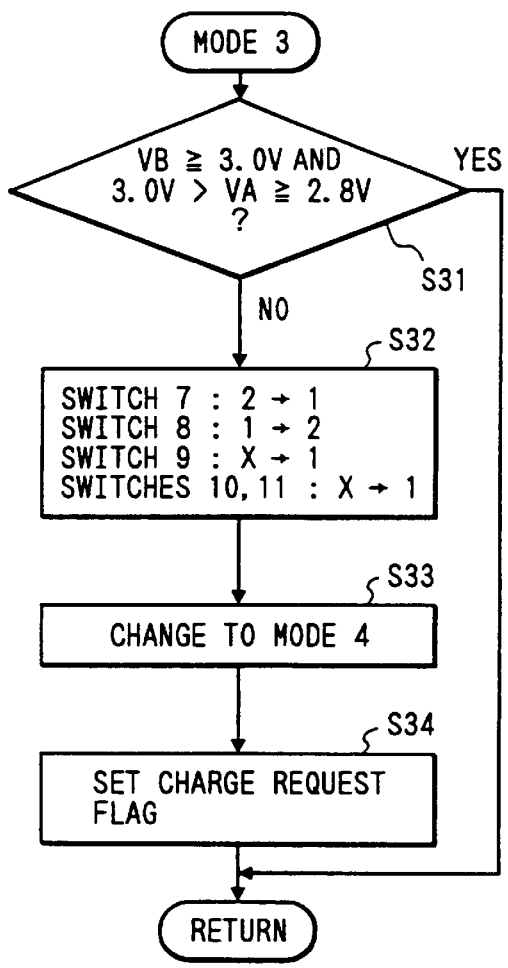
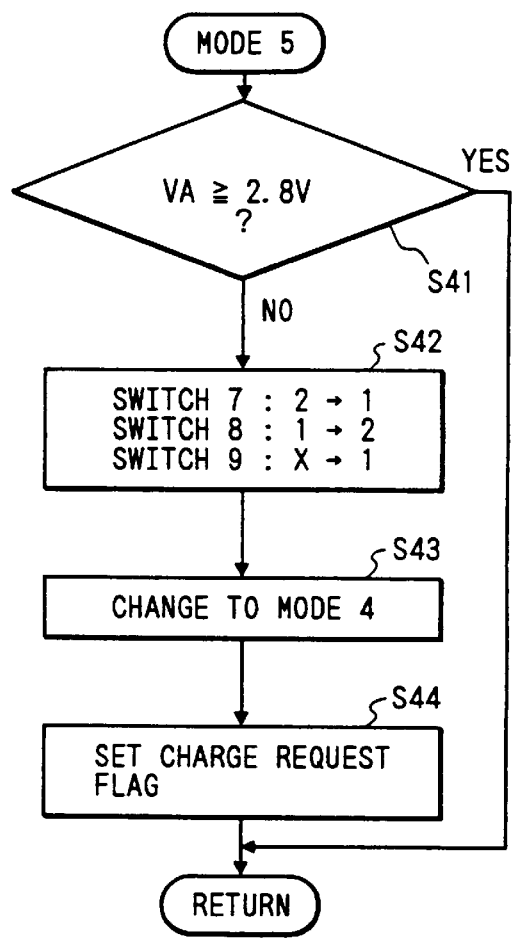

ELECTRONIC APPARATUS HAVING MULTIPLE LOADS, DRIVEN BY PLURAL BATTERIES

This application is a continuation of application Ser. No. 08/239,543 filed May 9, 1994, now abandoned.

BACKGROUND OF THE INVENTION

1. Field of the Invention

The present invention relates to an electronic apparatus, which uses a battery for a drive source, and more particularly to a drive controller and an electronic apparatus which are designed to perform control so that batteries are efficiently used in the electronic apparatus having a plurality of batteries.

2. Related Background Art

Conventionally, an electronic apparatus, which uses a battery for a primary power supply, is provided with a plurality of batteries, and there are cases where batteries supplied are changed in accordance with the type of load or an operation mode of the electronic apparatus.

FIG. 23 is a block diagram which shows a schematic configuration of a conventional electronic apparatus with a backup memory. In the drawing, when power is turned ON by a switch, which is not shown, a voltage from a main battery 102 is turned into a regular voltage via a DC-DC converter 103 and supplied to a main body electronic circuit 101, and at the same time, the voltage, from converter 103 is also supplied to a backup memory 104.

On the other hand, when the power is turned OFF (at the time of backup) by the switch, which is not shown, if the main battery 102 exists and a sufficient battery capacity thereof remains, then the voltage, which has been turned into the regular voltage via a simple regular voltage circuit 105, is supplied from the main battery 102 to the backup memory 104; if the main battery does not exist or the battery capacity has fallen too much, then the voltage from a backup battery 106 is supplied directly to the backup memory 104. In general, a dry cell or a secondary battery such as a NiCd battery, nickel-hydrogen battery or a lithium ion secondary battery is used for the main battery, while a lithium battery is used for the backup battery.

FIG. 24 is a block diagram which shows a schematic configuration of another example of the conventional electronic apparatus. This electronic apparatus is provided with a plurality of batteries 102, 107 of the same type, and the power supply which supplies power to a main body 109 of the electronic apparatus is changed by switching between the main battery 102, which is identical to the one of FIG. 23, and a small auxiliary battery 107 which generates the same voltage as the main battery. In other words, the power supply is configured so that the main battery 102 is normally used and it is switched to the auxiliary battery 107 only when the capacity of the main battery 102 lowers or if a power failure occurs.

Further, FIG. 25 is a block diagram which shows a schematic configuration of still another example of the conventional electronic apparatus; it illustrates a small portable electronic apparatus such as an electronic calculator. In general, this type of electronic apparatus has a load (logic) 110 and a load (device) 111, and a voltage from the main battery 102 is supplied directly to the load (logic) 110 and, after being voltage from the main battery 102, which voltage is boosted via a boosting circuit 112, is supplied to the load (device) 111. In this case, the load (logic) 110 primarily comprises a CPU, main memory, backup memory, etc., while the load (device) 111 primarily comprises an LCD display, a hard disk drive, etc. The load (logic) 110 is directly driven by the main battery 102 because this is advantageous in that the electronic apparatus can be made smaller and power efficiency is increased since no extra circuit is provided.

In an electronic apparatus which has a peak load device such as a power supply, light, and a hard disk drive, when the entire electronic apparatus is operated by a system clock, there are cases where the voltage of the whole electronic apparatus drops due to the operation of the peak load device, affecting the operations of the load (logic) and a microprocessor. Particularly in the case of an electronic apparatus which uses a battery as a power supply, such a voltage drop affects the operations of the load (logic) and the microprocessor, occasionally resulting in malfunction. For this reason, for an electronic apparatus which uses an AC adapter as a power supply, the power capacity was made considerably larger than a total load capacity, while for an electronic apparatus which uses a battery as a power supply, the use of the apparatus was prohibited even if the battery still had a certain level of capacity left.

In the conventional electronic apparatus provided with a plurality of batteries described above, however, each battery is allocated to each function of a load; therefore, a constant relationship of connection between the batteries and the loads is always maintained regardless of the operating conditions of the electronic apparatus or the remaining capacity of the batteries. This causes each of the batteries always to perform a single operation. More specifically, the batteries are designed so that when the batteries are supplying voltages to the loads, they perform only the supply and they cannot concurrently perform any other operation such as charging.

Further, in a late advanced electronic apparatus, there is an increasing demand that the load (logic) be driven directly by a battery, that is, driven without going through a regular voltage control circuit, because of a trend toward lower voltage and energy saving. To meet such a demand, separate batteries may be connected to the load (logic) and other loads (devices, including an LCD display and a hard disk drive), respectively. This, however, requires that batteries of different capacities be connected in order to operate both loads for the same time because there is a difference in power consumption between the two types of loads. Hence, each battery is strictly used for the load to which it is connected, resulting in limited freedom in use of the batteries. For instance, when the remaining capacity of a battery has decreased, no other battery is allowed to replace the battery.

Therefore, as shown in FIG. 26, the conventional electronic apparatus used to be configured so that only a single combined battery 113 with a large capacity is used, and the voltage output from the combined battery 113 is converted by a DC-DC converter 114 to suit the individual loads. This presented a problem in that the load (logic), which should be driven directly, must always be driven via the regular voltage control circuit (DC-DC converter 114) just as in the case of other loads. Furthermore, since the combined battery 113 is used, at the time of backup, that is, when the voltage to be supplied to a load is low, the voltage of the combined battery must be dropped via the simple regular voltage circuit, consuming power wastefully.

There was another problem in that, if one has to go out carrying the conventional electronic apparatus immediately after beginning charging, then the charging must be interrupted, and when one tries to use the electronic apparatus at a destination, the apparatus cannot be used because the remaining capacity of the battery thereof is not enough.

There was still another problem in that in the conventional electronic apparatus, which has a peak load device, the power capacity is made larger than necessary, resulting in higher cost and an increased size of the apparatus. Furthermore, even with the large power capacity, it was difficult fully to eliminate influences exerted by peak load in order to completely prevent malfunction of the electronic apparatus.

SUMMARY OF THE INVENTION

It is accordingly the first object of the present invention to provide an electronic apparatus which enables a higher degree of freedom of a plurality of batteries to accomplish improved operating efficiency of the batteries and permits reduced power consumption and meets emergency need immediately after starting charge.

It is the second object of the present invention to provide an electronic apparatus which makes it possible to use batteries of smaller capacities thereby reducing the cost and size of the apparatus and to eliminate the influences such as malfunction exerted by peak load.

To fulfill the objects described above, one feature of the present invention is that an electronic apparatus, wherein a plurality of loads are independently driven by a plurality of batteries, has a switching means which automatically switches a system of connection of the batteries and the loads in accordance with the conditions of the electronic apparatus.

Preferably, the conditions of the electronic apparatus described above are the remaining capacities of batteries, load changes in loads, or temperature changes in the electronic apparatus.

Further, another aspect of the invention is that an electronic apparatus, which is provided with a system clock generating means for generating a system clock, and a peak load device, which has a steep load characteristic (peak load characteristic), has a system clock control means which stops supplying the system clock generated by the system clock generating means or divides the system clock while the peak load device is generating a peak voltage.

BRIEF DESCRIPTION OF THE DRAWINGS

FIG. 9 is flowcharts of subroutine which show processing procedures of mode 2 and mode 4;

FIG. 10 is a flowchart of a subroutine which shows a processing procedure of mode 3;

FIG. 11 is a flowchart of a subroutine which shows a processing procedure of mode 5;

DETAILED DESCRIPTION OF THE PREFERRED EMBODIMENTS

The following explains in detail the embodiments of the present invention with reference to the drawings.

Figure 1:
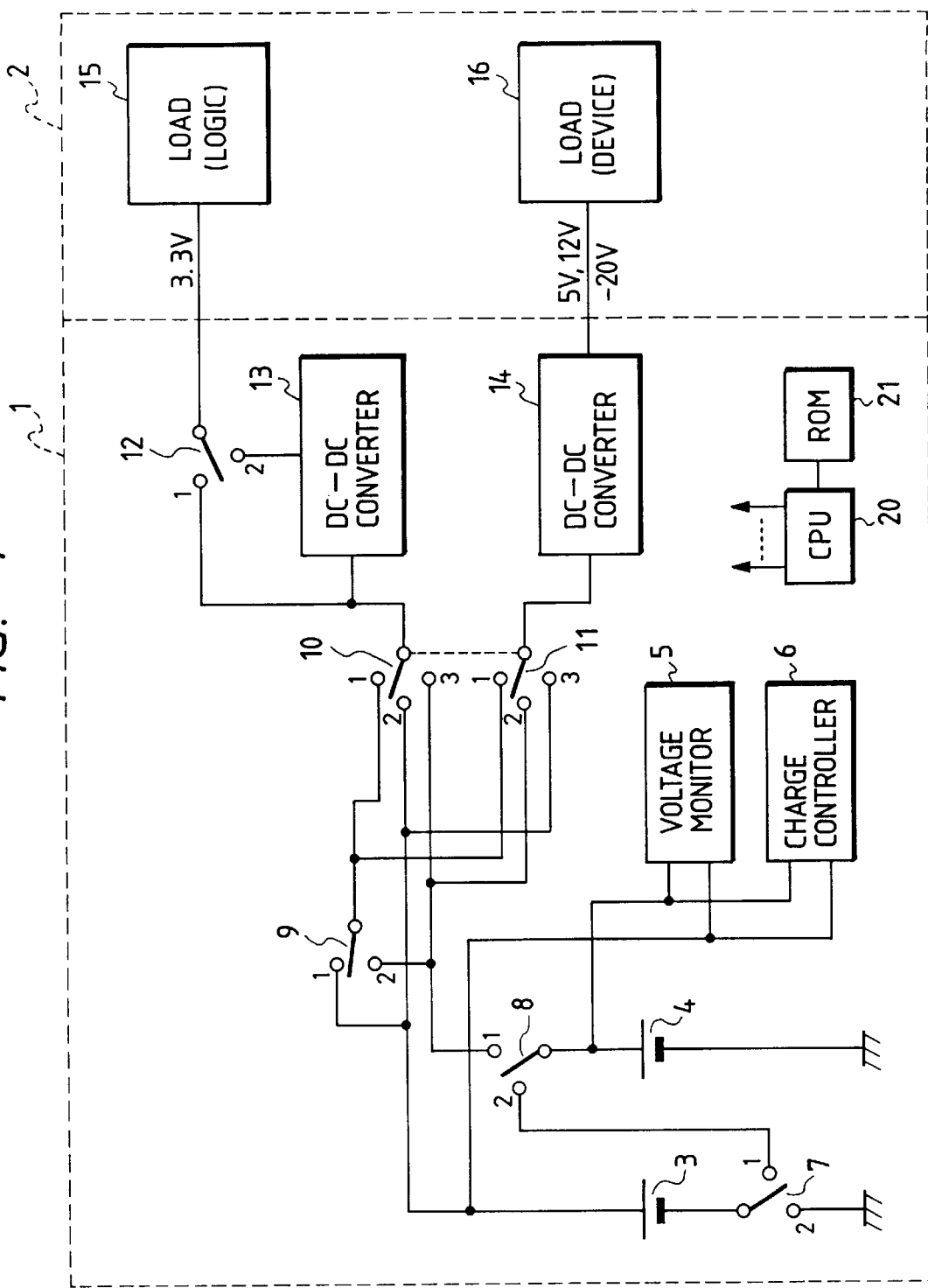
FIG. 1 is a block diagram which shows a schematic configuration of the first embodiment of the electronic apparatus according to the present invention.

FIG. 1 is the block diagram which shows the schematic configuration of the first embodiment of the electronic apparatus according to the present invention.

In the drawing, the electronic apparatus of the embodiment is comprised of a dynamically connected circuit 1 of the batteries, which constitutes a characteristic of the present invention, and an apparatus main body 2. The dynamically connected circuit 1 of the battery is comprised of batteries 3, 4, which are the same type and have the same capacity and which are power supplies for driving the apparatus main body 2, a voltage monitor 5, which monitors the terminal voltages of the batteries 3, 4, a charge controller 6 for charging the batteries 3, 4, switches 7 through 12 for switching the system of connection between the batteries 3, 4 and the apparatus main body 2, DC-DC converters 13, 14, which are regular voltage control circuits, a CPU 20 for controlling the sections, and a ROM 21 wherein a procedure implemented by the CPU 20 is stored.

Further, the apparatus main body 2 is comprised of a load (logic) 15, which consists of arithmetic and control devices such as a CPU, main memory, backup memory, and RTC (real-time clock), and a load (device) 16, which consists primarily of a display unit (liquid crystal, backlight, etc.), memory (hard disk drive (HDD), floppy disk drive, IC card, etc.), communication controller, and input device (keyboard, digitizer, etc.). In this case, the load (logic) 15 is recently driven on 3.3 V due to ICs with lower voltages and the demand for energy saving, and even if the power is OFF, the power is supplied to some parts for backup to keep them ON.

In the battery dynamically connected circuit 1, the batteries 3, 4 employ lithium ion secondary batteries, which are being put in practical use recently. The lithium ion secondary batteries are used because they exhibit many advantages, including higher battery voltage (3.6 V on the average), higher weight/volume energy density (higher capacity), less self discharge, easy checking of remaining capacity, and easy discharge. The remaining capacity can be easily checked because the terminal voltage of the lithium ion secondary battery linearly drops (4.2 V to 2.8 V) as discharge proceeds; therefore, the remaining capacity of the battery can be detected by monitoring the terminal voltage.

As previously described, the voltage monitor 5 monitors the terminal voltages of the batteries 3, 4, and the CPU 20 determines the remaining capacities of the batteries 3, 4 from the terminal voltages, then changes the connection system of the batteries 3, 4 by controlling the switches 7 through 12 in accordance with a method to be described later. And if a result of determining the remaining capacities of the batteries 3, 4 reveals the need of charging, then the CPU 20 instructs the charge controller 6 to charge the battery 3 or the battery 4 through the AC adapter which is not shown. The lithium ion secondary batteries are charged through the AC adapter (not shown) which consists of a regular voltage charging device (with a current limiter).

The DC-DC converter 13 is a regular voltage control circuit which generates the voltage supplied to the load (logic) 15 and it converts the voltage supplied from the AC adapter (not shown) to 3.3 V. The voltage supplied to the DC-DC converter 13 at the time of backup uses an output from a series circuit (not shown) rather than an output from the DC-DC converter 13. Further, the direct drive voltage from the batteries 3, 4 and the voltage supplied by the DC-DC converter 13 are selected by the switch 12 and applied to the load (logic) 15.

The DC-DC converter 14 is a regular voltage control circuit which generates the voltage supplied to the load (device) 16 and it converts the voltage supplied by the batteries 3, 4 into 5 V, 12 V, −20 V or other voltage which is required by the load (device) 16. The DC-DC converter 14 is designed so that all outputs thereof are turned OFF when the power is turned OFF.

The connection system of the batteries 3, 4 of the electronic apparatus which is configured as described above will now be explained.

Figure 2:
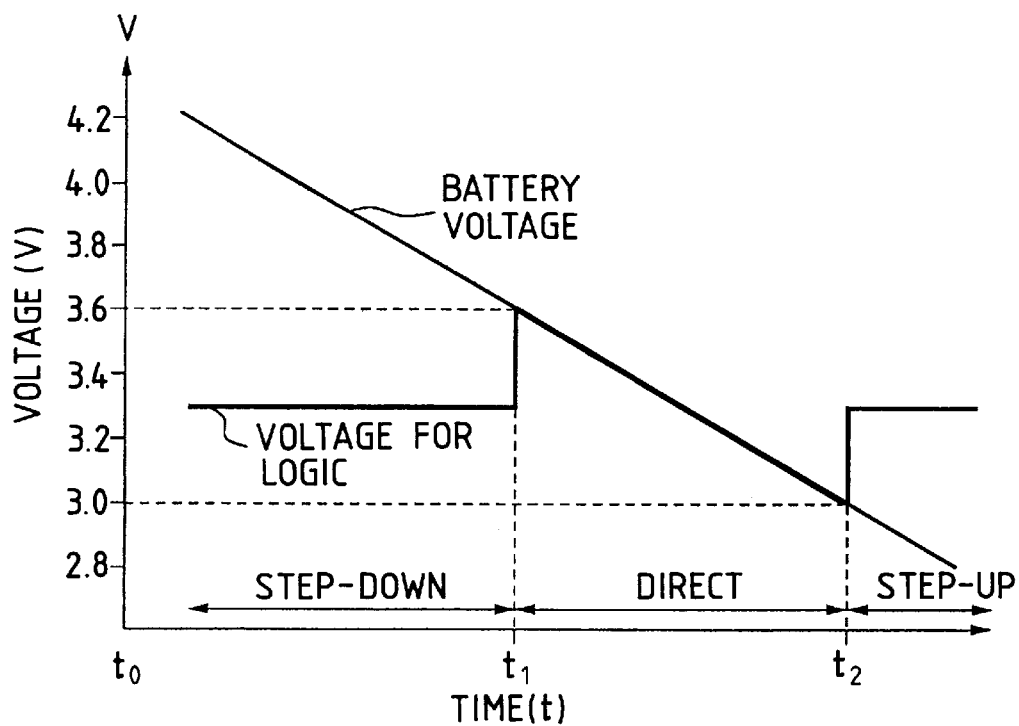
FIG. 2 is a diagram which shows relationship between a battery voltage of FIG. 1 and a driving method of the load (logic)

FIG. 2 is the diagram which shows the relationship between the terminal voltages of the batteries 3, 4 of FIG. 1 and the driving method of the load (logic) 15, the axis of ordinates indicating voltage V, while the axis of abscissa indicating time t.

The permissible range of the voltage supplied to the load (logic) 15 is 3.3V±10%; therefore, the supply voltage needs to range from 3.0 V to 3.6 V. Hence, when the terminal voltages of the batteries 3, 4 are higher than 3.6 V, that is, during a period of time $t_0$ to $t_1$, the terminal voltages are decreased to 3.3 V via the DC-DC converter 13 (regular voltage drop control).

Next, when the terminal voltages of the batteries 3, 4 are within a range of 3.0 V to 3.6 V, that is, during a period of time $t_1$ to $t_2$, the output voltages of the batteries 3, 4 are supplied to the load (logic) 15 (direct drive). This is conducted to prevent the power efficiency from being reduced by supplying the voltages via the DC-DC converter 13. Accordingly, when the terminal voltage of either one of the batteries enters the voltage range, that battery is preferentially connected to the load (logic) 15 to directly drive the load (logic) 15. Further, if the terminal voltages of both batteries 3, 4 are within the voltage range, then control is performed to alternately switch the connection appropriately.

When the terminal voltages of the batteries 3, 4 drop below the permissible range of the voltage supplied to the load (logic) 15, that is, after a time $t_2$, the terminal voltages are increased to 3.3 V (regular voltage boosting control) via the DC-DC converter 13.

Figure 3:
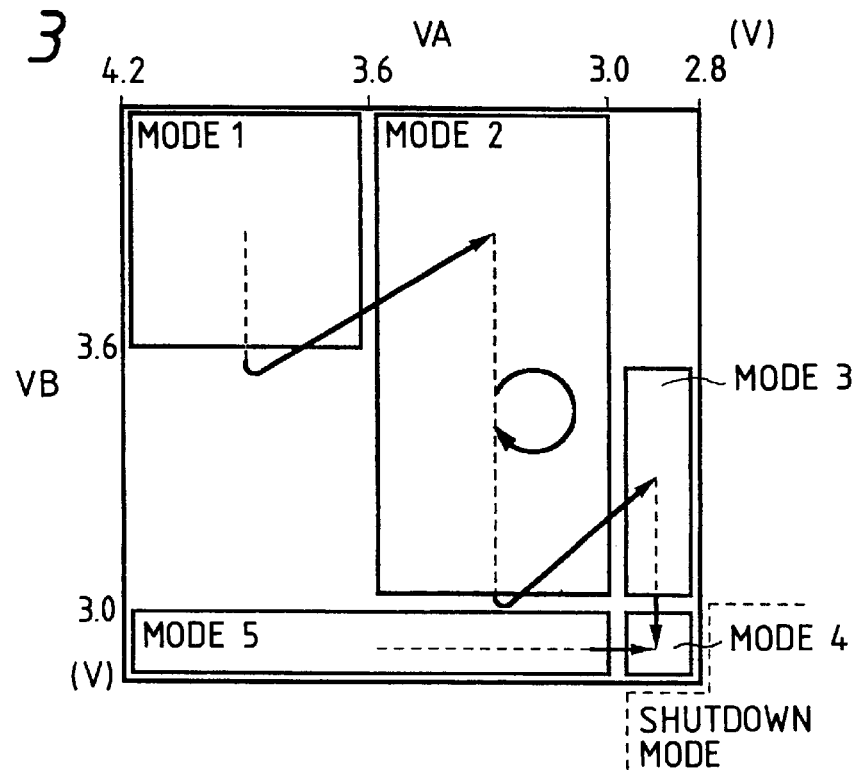
FIG. 3 is a state transition diagram which shows relationship between the battery voltage of FIG. 1 and connection/driving modes.

FIG. 3 is the state transition diagram which shows the relationship between the terminal voltages of the batteries 3, 4 and the connection/driving modes. In the diagram, the axis of abscissa indicates a terminal voltage VA of a battery connected to the load (logic) 15, while the axis of coordinate indicates a terminal voltage VB of the battery connected to the load (device) 16. The arrows indicate mode changes.

Mode 1 is a mode wherein the terminal voltages of both batteries 3, 4 are 3.6 V or more and the batteries 3, 4 may be connected to either the load (logic) 15 or the load (device) 16.

Mode 2 is a mode wherein the terminal voltage of either the battery 3 or the battery 4 is in the voltage range (3.0 V to 3.6 V) for directly driving the load (logic) 15, and the battery is connected to the load (logic) 15.

Mode 3 is a mode wherein the terminal voltages of both batteries 3, 4 have dropped, the terminal voltage of one of the batteries being 3.0 V or less and the terminal voltage of the other battery being in the voltage range (3.0 V to 3.6 V) for the direct drive of the load (logic) 15, and the latter battery is connected to the load (device) 16, which consumes more power, while the former battery is connected to the load (logic) 15 via the DC-DC converter to increase the voltage.

Mode 4 is a mode wherein the terminal voltages of both batteries 3, 4 have dropped to 3.0 V or less, and the batteries 3, 4 are connected in series to supply the voltages to the DC-DC converters 13, 14. At this time, the series connection does not cause any trouble even if the remaining capacities of the two batteries 3, 4 are different because the internal impedance of a lithium ion secondary battery remains constant regardless of the remaining capacity.

Mode 5 is a mode wherein one of the batteries 3, 4 has just been charged, while the other battery scarcely has a remaining capacity, and the whole apparatus is driven by only the former battery.

In addition, a shutdown mode is a mode wherein the terminal voltages of both batteries 3, 4 have dropped to 2.8 V or less, giving a sign of the expiration of the battery service life, and therefore further use of the apparatus is prohibited and only backup is securely conducted.

Figure 4A:
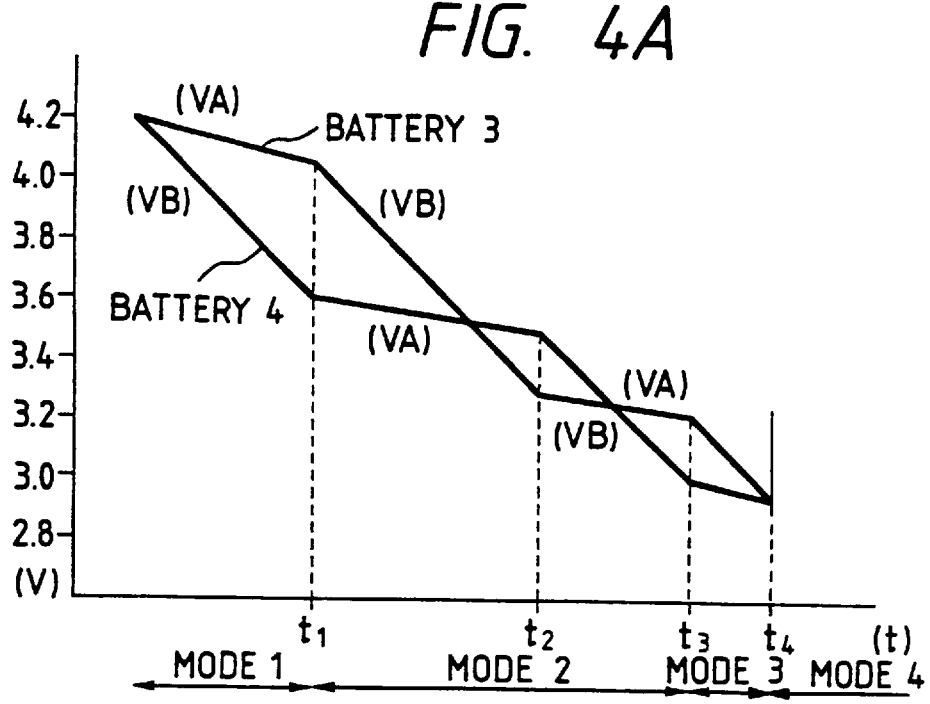
FIG. 4A and FIG. 4B show changes in the battery voltage of FIG. 1 in relation to the modes.
Figure 4B:
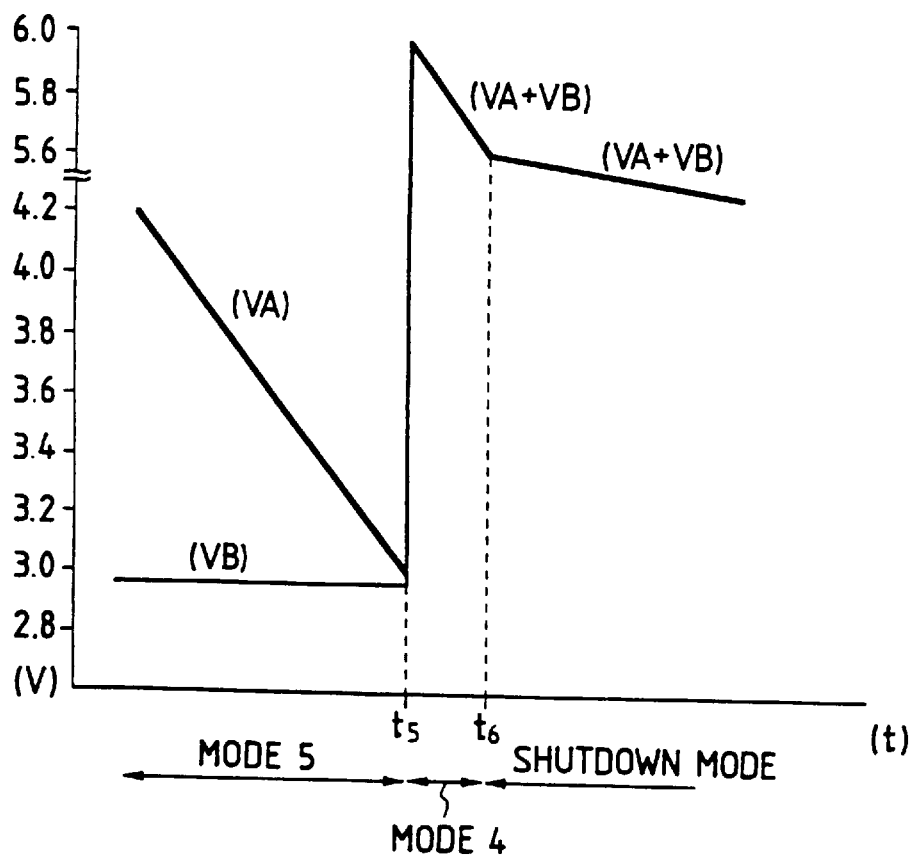

FIGS. 4A and 4B are the diagrams which show the changes in the terminal voltages of the batteries 3, 4 in relation to the modes, the axis of coordinate indicating the voltage V, while the axis of abscissa indicating the time t. FIG. 4A shows the changes observed from mode 1 to mode 3 via mode 2, while FIG. 4B shows the changes observed from mode 5 to the shutdown mode via mode 4. The initial values of the terminal voltages of the batteries 3, 4 are both 4.2 V because it is assumed that both batteries 3, 4 have just been charged.

In FIG. 4A, first, the battery 3 (terminal voltage VA) is connected to the load (logic) 15 and the battery 4 (terminal voltage VB) is connected to the load (device) 16, leading to mode 1. Then, the terminal voltage VB of the battery 4, which is connected to the load (device) 16 having large power consumption, drops more quickly than the terminal voltage VA of the battery 3 and reaches 3.6 V in time $t_1$, then the battery connection is switched; more specifically, the battery 3 is connected to the load (device) 16, while the battery 4 is connected to the load (logic) 15 (mode 2).

Subsequently, as the voltage falls under the connection condition, the voltage relationship between the terminal voltage VA and the terminal voltage VB is reversed, and when the difference exceeds a certain voltage (e.g., 0.2 V) in the time $t_2$, the connection between the batteries 3, 4 and the loads 15, 16 is changed again. Thus, in mode 2, the connection between the batteries 3, 4 and the loads 15, 16 is changed in accordance with the voltage difference between the battery 3 and the battery 4.

And when the terminal voltage of either the battery 3 or the battery 4 has dropped to 3.0 V or less in the time $t_3$, the mode transfers to mode 3. As the terminal voltage VA or VB further drops in the time $t_4$, the mode transfers further to mode 4.

In FIG. 4B, when only one of the batteries 3, 4 has a sufficient remaining capacity, the load (logic) 15 and the load (device) 16 are driven by only that battery (the battery 3 in FIG. 4B) (mode 5). As the terminal voltages of the batteries 3, 4 further drop, the mode transfers to mode 4 in the time $t_5$ and to the shutdown mode in the time $t_6$.

Figure 5:
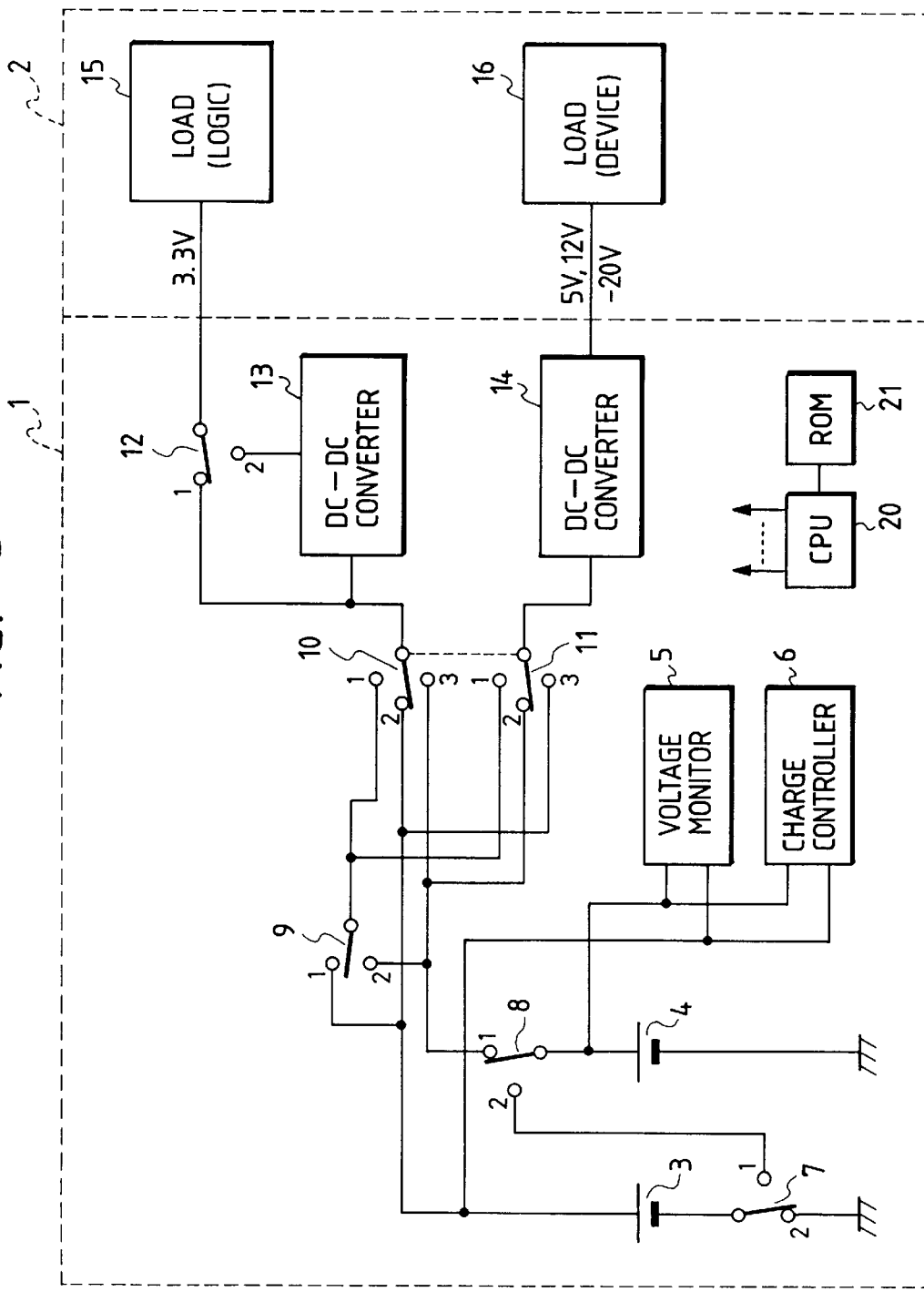
FIG. 5 is a diagram which shows the connection states of all switches in mode 2.

FIG. 5 is the diagram which shows an example of the connection states of the switches 7 through 12 in mode 2. In FIG. 5, the voltage of the battery 3 with the negative terminal thereof grounded is directly supplied to the load (logic) 15 by the switch 7 via the switch 10 and the switch 12. The voltage of the battery 4, which has been boosted by the DC-DC converter 14, is supplied to the load (device) 16 via the switch 11.

Figure 6:
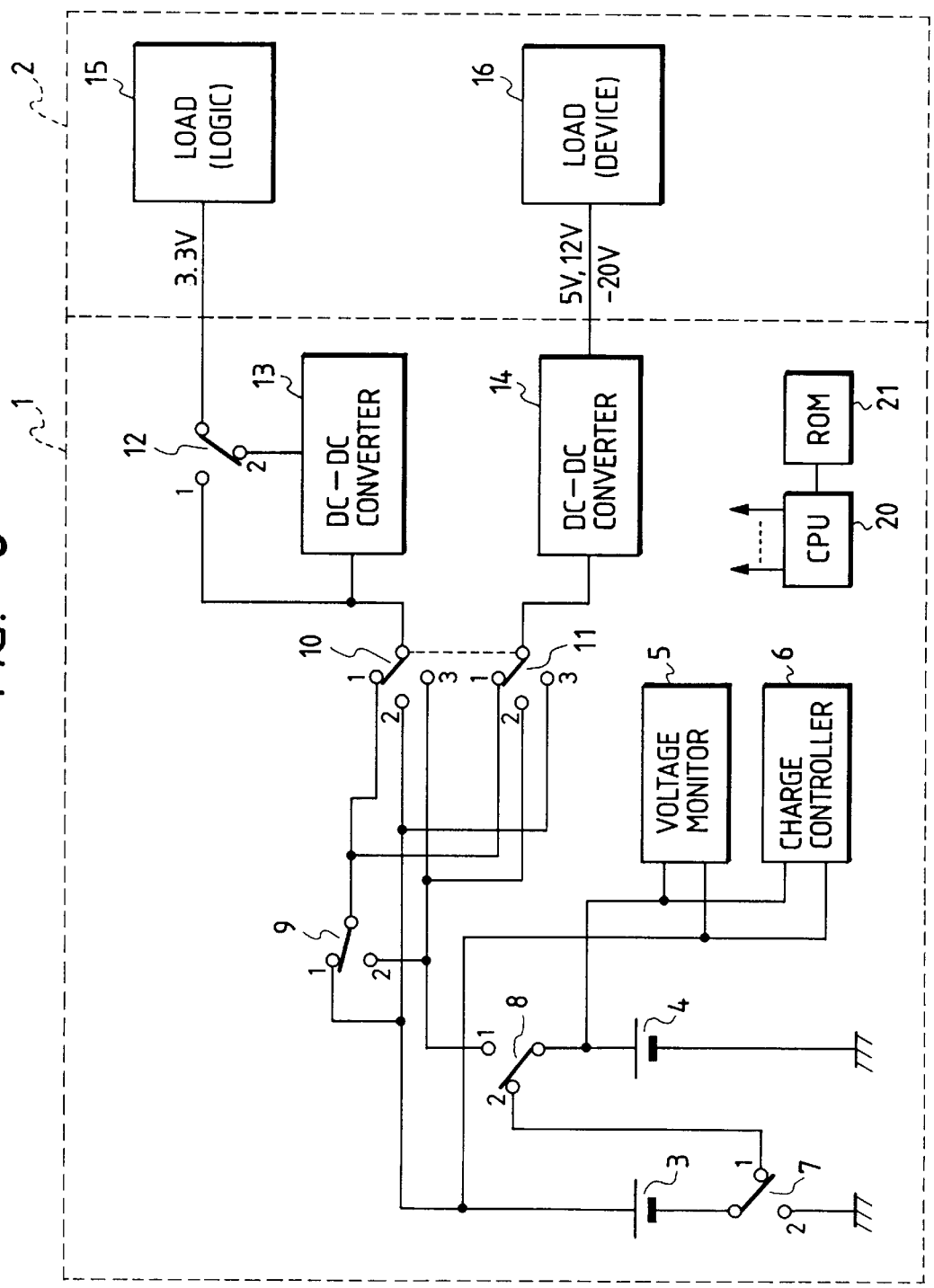
FIG. 6 is a diagram which shows the connection states of all switches in mode 4.

FIG. 6 is the diagram which shows another example of the connection states of the switches 7 through 12 in mode 4. In FIG. 6, the batteries 3, 4 are connected in series by the switches 7 and 8. The voltages of the batteries 3, 4, which are connected in series, are boosted by the DC-DC converter 13 via the switches 9, 10 and supplied to the load (logic) 15 via the switch 12. The voltages of the batteries 3, 4, which are connected in series, are boosted by the DC-DC converter 14 via the switches 9, 11 and supplied to the load (device) 16.

Figure 7:
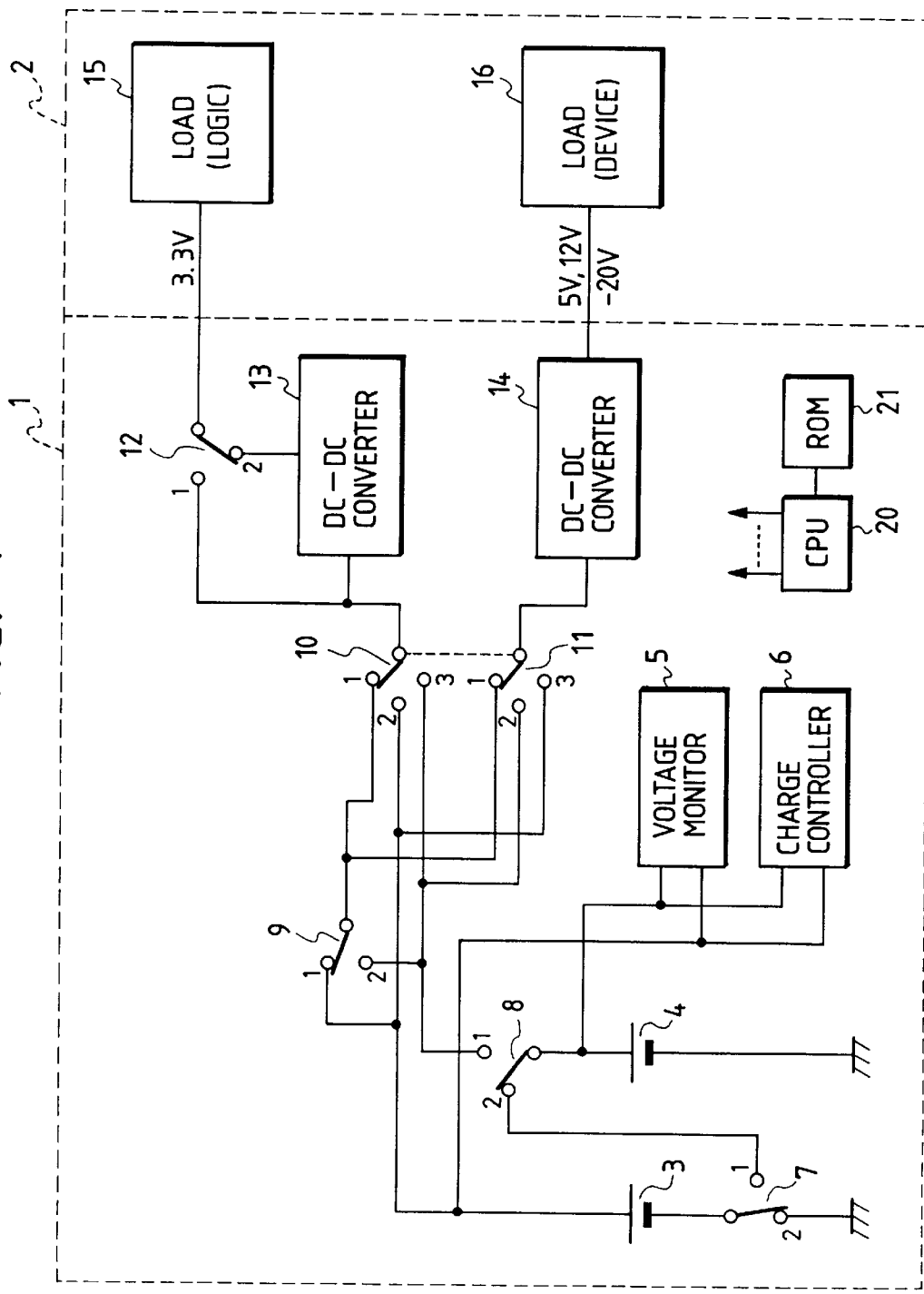
FIG. 7 is a diagram which shows the connection states of all switches in mode 5.

FIG. 7 is the diagram which shows still another example of the connection states of the switches 7 through 12 in mode 5. In FIG. 7, the battery 4 is isolated from the loads 15, 16 by the switches 7, 8. At this time, the battery 4 is charged by the AC adapter (not shown) under the control of the charge controller 6. The voltage of the battery 3 with its negative terminal grounded by the switch 7 is boosted by the DC-DC converter 13 via the switches 9, 10 and supplied to the load (logic) 15 via the switch 12. Likewise, the voltage of the battery 3 is boosted by the DC-DC converter 14 and supplied to the load (device) 16.

FIG. 8 through FIG. 11 are the flowcharts which show the subroutine procedures for transferring the modes. The CPU in the dynamically connected circuit 1 generates a timer interrupt each time a predetermined time elapses, and in the interrupt processing, it always monitors the terminal voltages of the batteries 3, 4 through the voltage monitor 5 and carries out the subroutine processing in accordance with the current mode. More specifically, the CPU compares the terminal voltages with the current mode and decides whether it should continue the current mode or transfer to a different mode.

Figure 8:
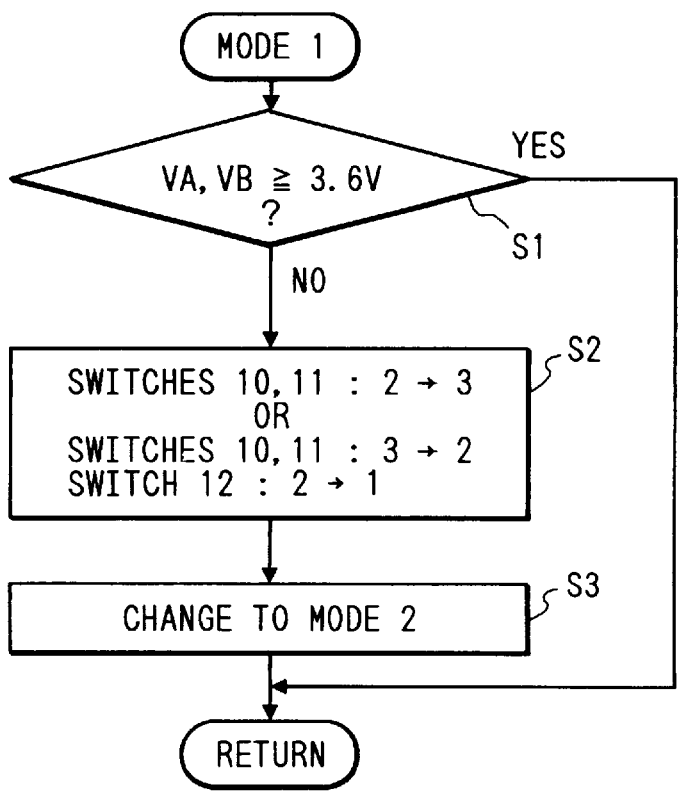
FIG. 8 is a flowchart of a subroutine which shows a processing procedure of mode 1.

FIG. 8 is the subroutine flowchart which shows the processing procedure of mode 1.

If the current mode is mode 1, then the CPU 20 calls up the subroutine from the ROM 21 to first determines whether the terminal voltages VA, VB are both 3.6 V or more (a step S1), and if it determines that they are 3.6 V or more, then it terminates the subroutine processing. On the other hand, if either the terminal VA or VB is found to be lower than 3.6 V in the step S1, then the CPU switches the connection of the switch 12 to the terminal 1 in a step S2 so that the output from the DC-DC converter 13 is supplied to the load (logic) 15 and it switches the connection of the switches 10, 11 to reverse the connection between the batteries 3, 4 and the load (logic) 15 and the load (device) 16. Subsequently, in a step S3, the CPU changes the current mode to mode 2 and terminates the subroutine processing.

FIG. 9 is the subroutine flowcharts which show the processing procedures for mode 2 and mode 4.

In mode 2, the CPU first determines whether the terminal voltages VA, VB are both 3.0 V or more (a step S11), and if they are 3.0 V or more, then it proceeds to a step S12 wherein it determines whether the difference between the terminal voltage VA and the terminal voltage VB is 0.2 V or more. If the difference is smaller than 0.2 V, that is, before reaching the time $t_2$ in FIG. 4A, then the CPU terminates the subroutine processing. On the other hand, when the difference reaches 0.2 V or more in the step S12, that is, when the time $t_2$ is reached, the CPU switches, in a step S13, the connection of the switches 10, 11 and terminates the subroutine processing as in the step S2 of FIG. 8.

Further, if both terminal voltages VA, VB are not 3.0 V or more, that is, if the terminal voltage VB is smaller than 3.0 V in S11, then the CPU proceeds to a step S14 wherein it determines whether the terminal voltage VB is 2.8 V or more; if the terminal voltage VB is 2.8 V or more, the CPU proceeds to a step S15 wherein it switches the connection of the switch 12 and the switches 10, 11 and terminates the subroutine processing as in the step S2 of FIG. 8. On the other hand, if the terminal voltage VB is found to be smaller than 2.8 V in a step S14, the CPU proceeds to a step S17 wherein it performs the shutdown mode processing described above. In a step S18, after the backup state begins, the subroutine processing is terminated.

Furthermore, in mode 4, the CPU determines in a step S21 whether the terminal voltages VA, VB are both 2.8 V or more; if they are both 2.8 V or more, then the CPU terminates the subroutine, while if they are both below 2.8 V, then the CPU carries out the processing of the steps S17 and S18 of mode 2 and terminates the subroutine processing.

FIG. 10 is the subroutine flowchart which shows the processing procedure for mode 3.

In mode 3, the CPU first determines in a step S31 whether the terminal voltage VB is 3.0 V or more, or the terminal voltage VA is 2.8 V or more and below 3.0 V at the same time; if the terminal voltages are in any ranges other than those mentioned above, then the CPU terminates the subroutine processing. On the other hand, if the determination result in the step S31 is within the ranges, then the CPU proceeds to a step S32 wherein it switches the connection of the switches 9, 10, 11 to the terminal 1, switches the connection of the switch 8 from the terminal 1 to the terminal 2, and switches the connection of the switch 7 from the terminal 2 to the terminal 1. In other words, the CPU connects the batteries 3, 4 in series to supply the power to the DC-DC converters 12, 13. In the step S32, x indicates that the terminal number may be any number.

Next, in a step S33, the current mode is changed to mode 4 and a charge request flag is set in a step S34. In other routine, which is not shown, the charge request flag is always monitored and if the flag is set, then the charge controller 15 charges the battery to be charged. Upon the completion of the charge, the charge request flag is reset.

FIG. 11 is the subroutine flowchart which shows the processing procedure for mode 5.

In mode 5, the CPU first determines in a step S41 whether the terminal voltage VA is 2.8 V or more, and if the terminal voltage VA is 2.8 V or more, then it terminates the subroutine processing.

On the other hand, if the terminal voltage VA is below 2.8 V, then the CPU proceeds to a step S42 wherein it changes the connection of the switches 7 through 9 in the same manner as that in the step S32 of FIG. 10, then changes the current mode to mode 4 (a step S43). After setting the charge request flag (a step S44), the subroutine is terminated.

Thus, the operation mode is changed in accordance with the terminal voltages of the batteries 3, 4; therefore, the batteries can be connected to proper loads in accordance with the remaining capacities of the batteries, and even if one has to go out carrying the electronic apparatus incorporating the batteries, he can use the apparatus at a destination by using the remaining capacities of the two batteries. If the voltage of one battery is within the voltage range, which is appropriate for the direct drive of the load (logic) 15, then the battery is preferentially connected to the load (logic) 15 and the other battery is connected to the load (device) 16, thus permitting optimum connection between the batteries 3, 4 and the apparatus main body 2. The batteries 3, 4 are designed so that both the batteries are connected in series when the capacities of the batteries 3, 4 have both become low. This makes it possible to continue supplying power concentrating on the most important element to the end.

It is needless to say that the switch changing timing is set so that the operation of the whole apparatus is temporarily held to prevent malfunction during the switching operation and also a capacitor having an adequate capacitance is connected in each network.

Further in this embodiment, mechanical switches like relays are used for all the switches 7 through 12, but it is needless to say that the type of switches to be used is not limited to the above; semiconductor switches or the like such as MOS transistors or the like may be used instead or any means designed for switching may be used. Furthermore, the lithium ion secondary batteries are used for the batteries, but other type of secondary batteries may be used, or primary batteries may be used if no charging is required. It is also a matter of course that the embodiment is not restricted to the two sets of batteries.

The second embodiment of the electronic apparatus according to the present invention will now be described.

The second embodiment differs from the first embodiment, wherein the connection system is changed in accordance with the battery capacities, only in that the connection system is changed in accordance with the change in load of the apparatus main body 2. Hence, the same apparatus as that of the first embodiment will be used for this embodiment and only the mode transitions will be changed.

Figure 12:
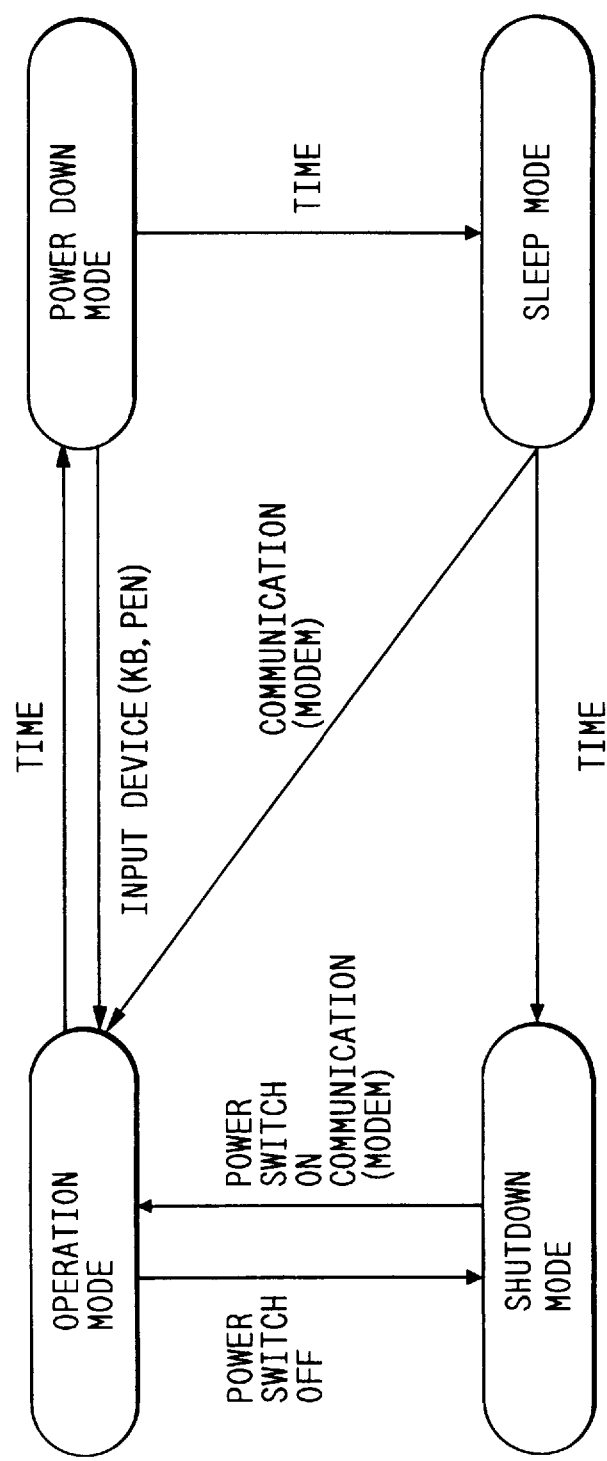
FIG. 12 is a diagram which shows mode transitions of an electronic apparatus according to the second embodiment.

FIG. 12 is the diagram which shows the mode transitions of the embodiment. As shown in the diagram, the current electronic apparatuses have various state modes to save energy. In this case, the power down mode is a mode wherein a display device and an input device are ON, an HDD is OFF, and a CPU clock is in a stop state, the sleep mode further placing the display device in an OFF state. The shutdown mode (suspend mode) is a mode wherein all functions except the backup section are placed in an OFF state. The factors involved in these mode state transitions are shown in FIG. 12. For instance, during the operation mode, if no input is given until a predetermined time elapses, the mode is changed to the power down mode. When another predetermined time elapses, the mode is changed to the sleep mode. In this manner, the mode transitions take place.

The connection system in the power down mode is changed in accordance with modes 1 through 5 in the first embodiment described above. The connection system in the sleep mode and the shutdown mode is changed in accordance with the states shown in FIG. 13. At this time, as shown in FIG. 13, basically, the apparatus main body 2 is driven on a single battery (the battery which supplies the terminal voltage VA).

Figure 13:
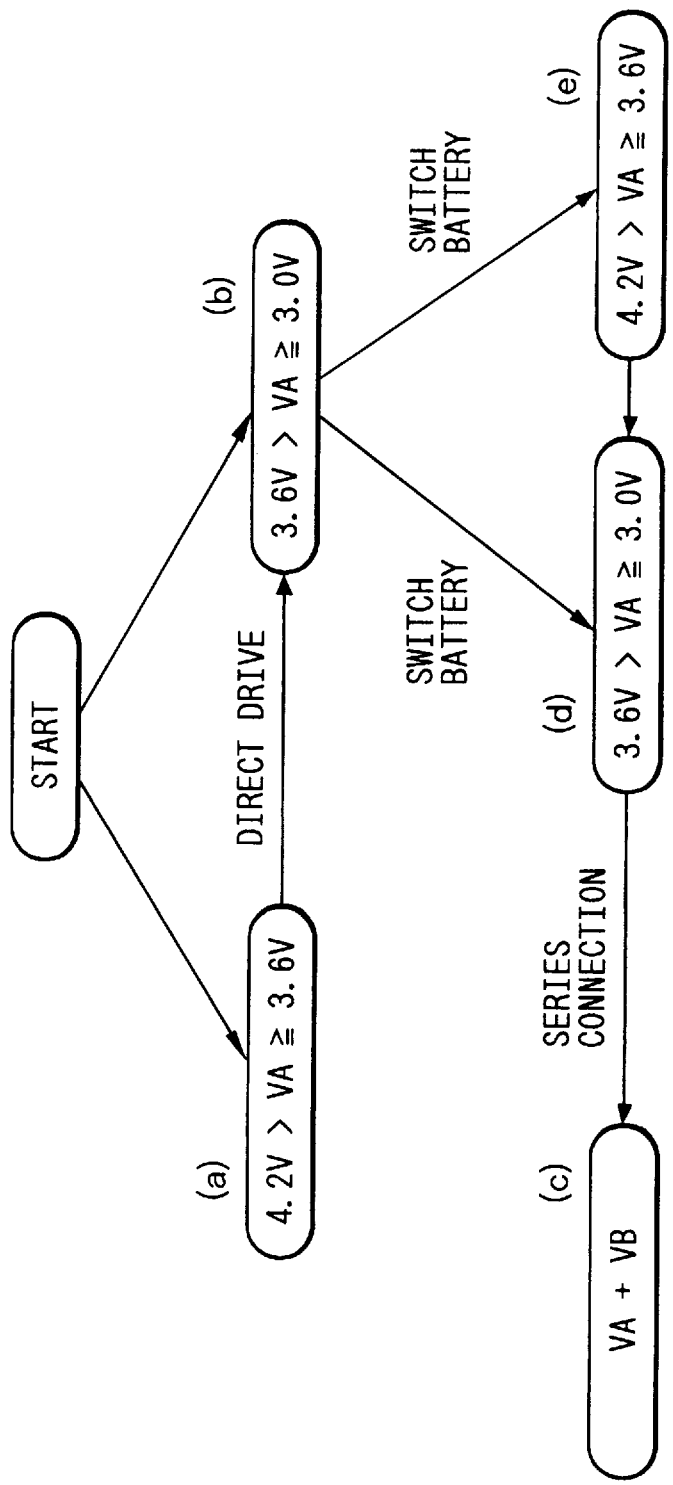
FIG. 13 is a diagram which shows changes in a connection system in a sleep mode and a shutdown mode of the electronic apparatus of the second embodiment.

When this mode is engaged, the connection is first made so that, of the batteries 3, 4, the battery which has a higher terminal voltage provides the terminal voltage VA, then the connection system of the batteries is changed in accordance with FIG. 13. More specifically, when the terminal voltage VA is in a state (a) $(4.2 > VA \geq 3.6)$, the voltage, which has been decreased via the DC-DC converter 13 shown in FIG. 1, is supplied to the load (logic) 15. When the terminal voltage VA is in a state (b) $(3.6 > VA \geq 3.0)$, the load (logic) 15 is directly driven, skipping the DC-DC converter 13. And when the terminal voltage VA lowers below 3.0 V, the connection system is switched so that the terminal voltage VA is supplied from the other battery. When the connection system is changed, the CPU 20 is momentarily started to change the setting of the switches 7 through 12. In general, the switching is not noticed by users.

Figure 14:
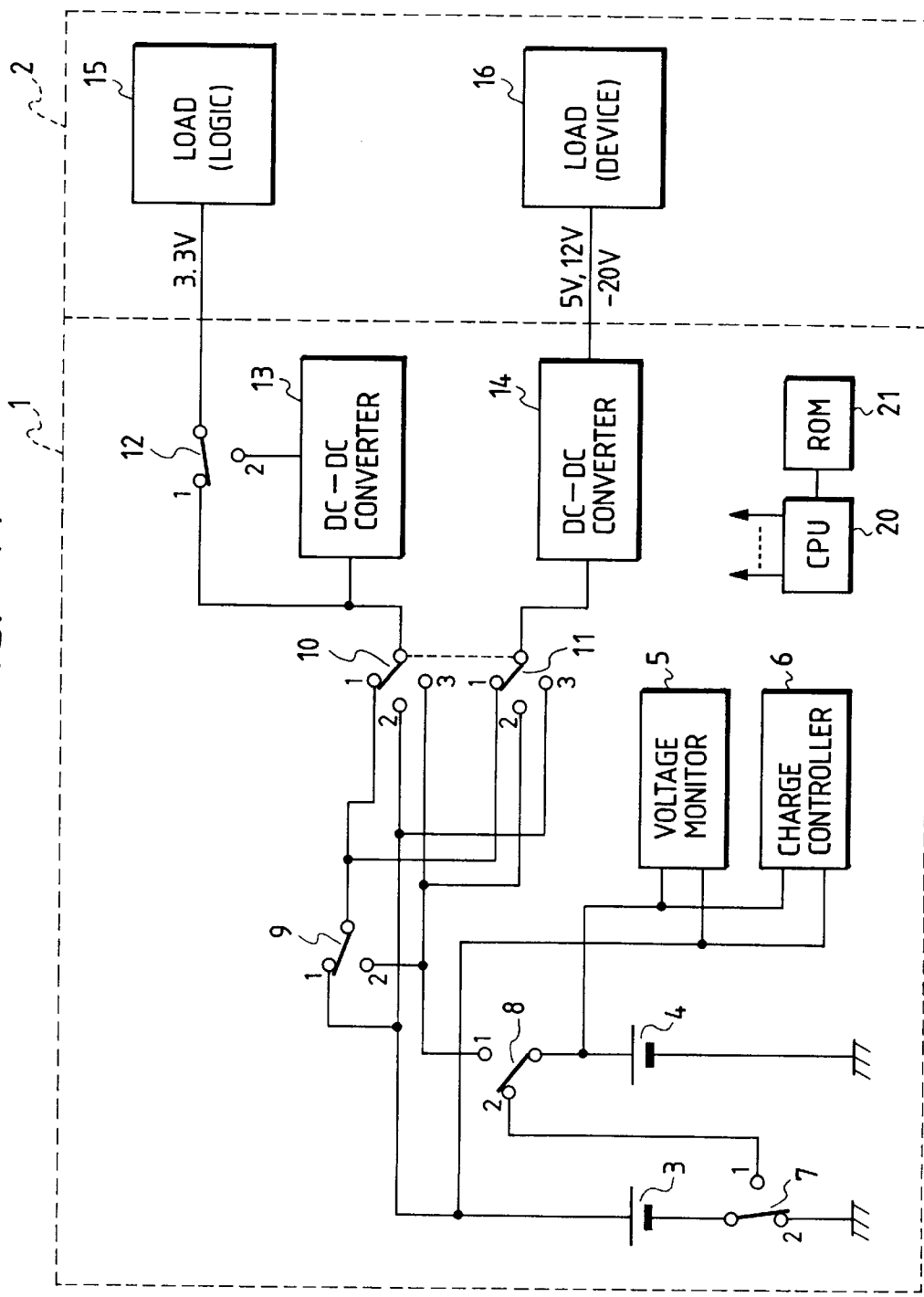
FIG. 14 is a diagram which shows an example of the connection system of state (b) of FIG. 13.

FIG. 14 is the diagram which shows an example of the connection system in the state (b) of FIG. 13. For example, when the mode at the time of operation is mode 2 (FIG. 5), if the apparatus is placed in the sleep mode, then the connection system will be as shown in FIG. 14. Specifically, the setting of the switches 8 through 11 are changed as shown in FIG. 14, and the voltage is supplied only from the battery 3 to the apparatus main body 2.

Thus, the configuration of the embodiment makes it possible to use only one of the batteries for the backup power supply during the suspend or sleep mode, allowing the other battery to rest or be charged independently.

Additionally, in this embodiment, a simple application example has been shown in relation to load changes, but the application is not limited to only that application example; the system may alternatively be designed to make a connection change for assuring safety against load changes to be predicted according to power management and also when possible disturbance of the system by the application of a big load is predicted in normal operation.

The third embodiment of the electronic apparatus according to the present invention will now be described.

This embodiment is different from the first and second embodiments, which are the examples showing the connection systems wherein basically the apparatus main body 2 is driven only from the batteries, in that, when the AC adapter is connected to the apparatus main body 2, the voltage is supplied to the apparatus main body 2 through the AC adapter.

Figure 15:
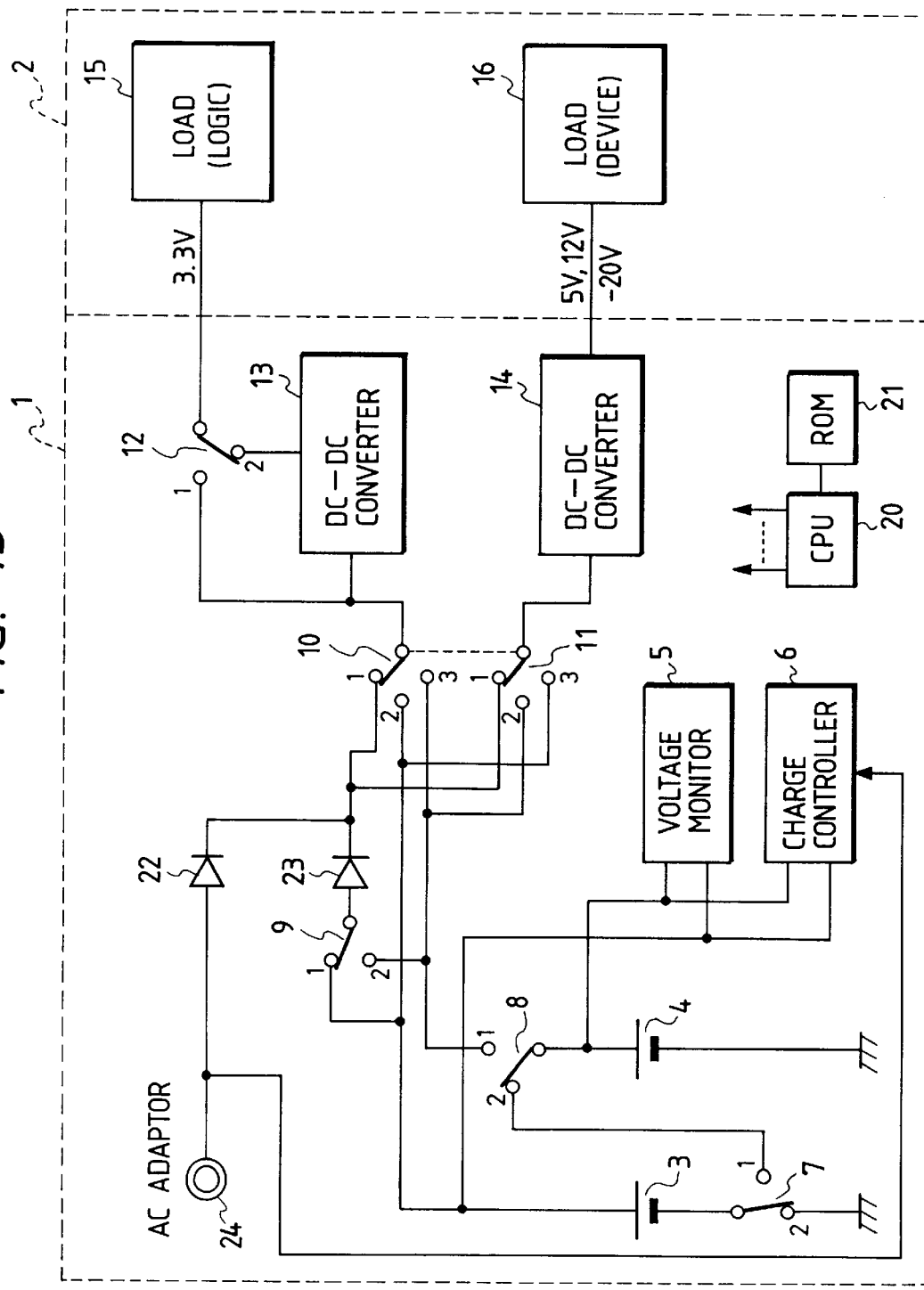
FIG. 15 is a block diagram which shows a schematic configuration of the third embodiment of the electronic apparatus according to the present invention.

FIG. 15 is the block diagram which shows the schematic configuration of the electronic apparatus according to the embodiment. FIG. 15 differs from FIG. 1 only in that it has an AC adapter 24 added and accordingly diodes 22, 23 added; therefore, the corresponding elements in FIG. 12 and FIG. 1 will be given the same reference numerals and detailed explanations will be omitted.

The AC adapter 24 is connected to the terminal 1 of the switch 10 via the diode 22, and the output side of the switch 9 is connected to the terminal 1 of the switch 10 via the diode 23. Further, the AC adapter 24 supplies the voltage also to the charge controller 6.

When the AC adapter 24 is used, the switches 10, 11 are connected to the terminal 1 and the switch 12 is connected to the terminal 2 in all the operation mode, power down mode, sleep mode, and shutdown mode. Either battery is always connected because there is such a danger that the AC adapter 24 is momentarily disconnected or removed accidentally. In this case, the battery 3 is connected. Connecting the battery is also greatly advantageous in that AC line noises are absorbed.

Through the AC adapter 24, the voltage is supplied to the charge controller 6, and this voltage is used for charging when the terminal voltage of the battery 3 has become 3.0 V or less and the charge flag described in the first embodiment has been set.

In the case of the lithium ion secondary batteries, a charge voltage exceeding 4.2 V poses a problem. For this reason, it is easier to control in a sense if the batteries are charged one at a time, but it is needless to say that, as an alternative, the lithium ion secondary batteries may be connected in series for charging by changing the connection system.

The fourth embodiment of the electronic apparatus according to the present invention will now be described.

This embodiment is an example which is configured for adaptation to changes in the surrounding environment (e.g., temperature) of the electronic apparatus.

Batteries in general take out currents by means of electrochemical reactions. The lithium ion secondary batteries used in this embodiment are advantageous in that they generate less heat because they take out the ion flow produced by oxidation reduction reactions, while they may be disadvantageous for discharging because of the less self heat generation of the batteries under a low-temperature environment. Of course, other batteries based on the electrochemical reactions are also disadvantageous at low temperature.

Hence, this embodiment is designed to detect the temperature of an environment where the electronic apparatus is located and to change the connection system of the batteries accordingly.

Figure 16:
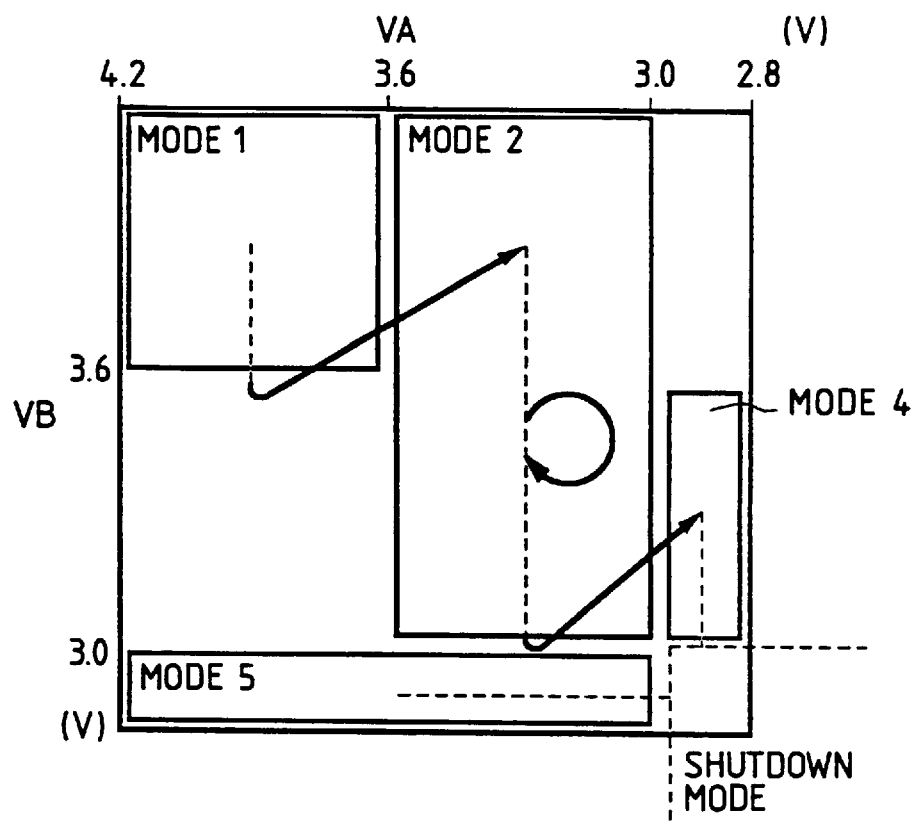
FIG. 16 is a diagram which shows mode transitions in the electronic apparatus according to the third embodiment.

FIG. 16 shows the mode transition diagram at low temperature (FIG. 3 shows the normal temperature) as an example. The embodiment has mode 3 removed, and it is designed so that the connection system is switched to the series connection (mode 4) when the voltage of one battery has come down to 3.0 V or less, and the shutdown mode is engaged when the voltages of both batteries have lowered down to 3.0 V or less.

The electronic apparatus of this embodiment is provided with a sensor (not shown) for measuring the present temperature. The standard low temperature switching range is 5° C. to 10° C.

As explained above, in the first through fourth embodiments, the connection system of the batteries is changed in accordance with the changes in the conditions of the electronic apparatus, namely, the changes in the battery capacity, load, temperature, etc. of the electronic apparatus, thereby making it possible to achieve higher operating efficiency of the batteries, energy saving, and extended service lives of the batteries.

The following describes an embodiment which fulfills the second object of the present invention.

Figure 17:
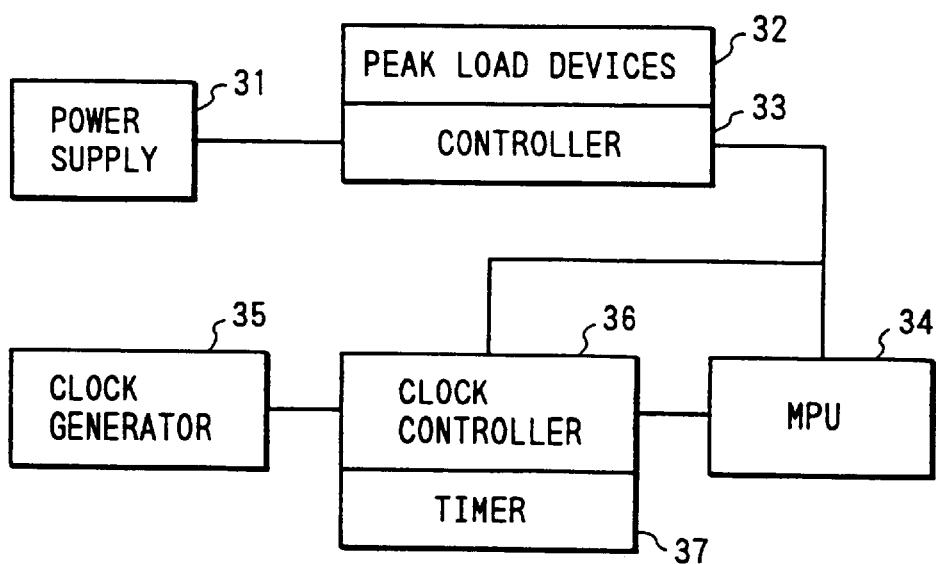
FIG. 17 is a block diagram which shows a schematic configuration of the fifth embodiment of the electronic apparatus according to the present invention.

FIG. 17 is the block diagram which shows the schematic configuration of the fifth embodiment of the electronic apparatus according to the present invention. In the drawing, the electronic apparatus of this embodiment is comprised of a power supply 31, which supplies voltage to the apparatus main body, a peak load device 32, which mainly consists of a motor and an incandescent lamp having a peak load characteristic, a controller 33, which turns ON and OFF the peak load device 32, a microprocessor 34, which controls the entire electronic apparatus including the controller 33, a clock generator 35, which generates system clocks, a clock controller 36, which controls the system clocks generated by the clock generator 35 and supplies the system clocks to the microprocessor 34, and a timer 37, which counts various times.

The clock generator 35 is connected to the microprocessor 34 and the controller 33 via the clock controller 36, and the system clocks are supplied to the whole electronic apparatus. The microprocessor 34 is also connected to the controller 33 and the clock controller 36 to control the controllers 33 and 36.

Figure 18:
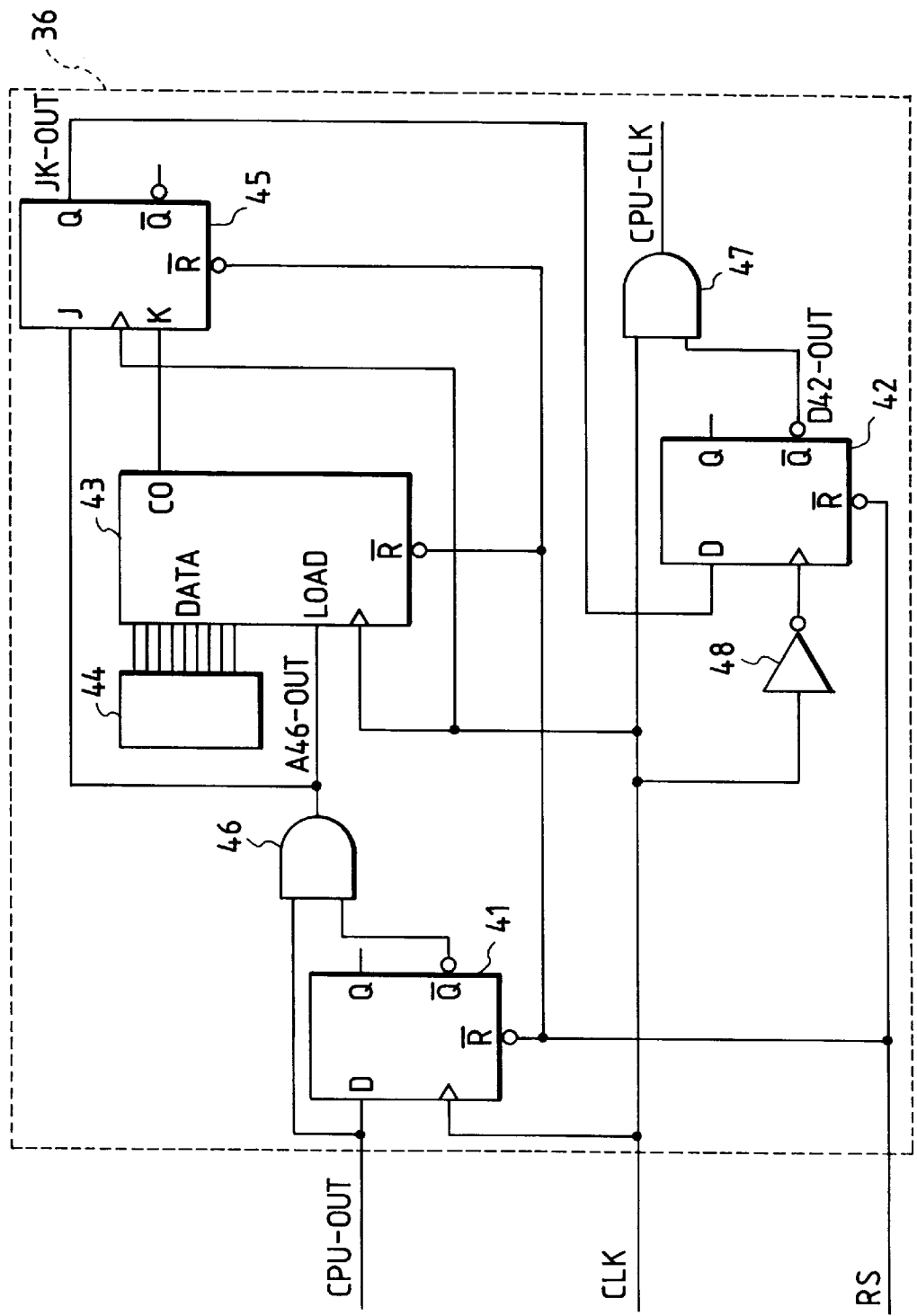
FIG. 18 is a block diagram which shows a detailed configuration of a clock controller of FIG. 17.

FIG. 18 is the block diagram which shows the detailed configuration of the clock controller 36 of FIG. 17. In the drawing, the clock controller 36 is comprised of two D flip-flops 41, 42, a down counter 43 which constitutes the timer, a register 44 for setting a count value, a JK flip-flop 45, AND circuits 46, 47, and an inverter 48.

A system clock CLK output from the clock generator 35 is supplied to clock input terminals of the D flip-flop 41 and the down counter 43 and also supplied to a clock input terminal of the D flip-flop 42 via the inverter 48 and further to one input terminal of the AND circuit 47. A system reset signal RS is reversed and supplied to the reset terminals of the D flip-flops 41, 42, the down counter 43, and the JK flip-flop 45. An output signal CPU-OUT from the microprocessor 34 is supplied to an input terminal D of the D flip-flop 41 and to one input terminal of the AND circuit 46. An output of an output terminal $\overline{Q}$ of the D flip-flop 41 is supplied to the other input terminal of the AND circuit 46. An output A46-OUT of the AND circuit 46 is supplied to a load terminal of the down counter 43 and also supplied to an input terminal J of the JK flip-flop 45.

A data output of the register 44 is supplied to a data input terminal of the down counter 43, and the down counter 43 supplies a carry signal from a carry output terminal CO to an input terminal K of the JK flip-flop 45. Further, an output JK-OUT from an output terminal $\overline{Q}$ of the JK flip-flop 45 is supplied to the input terminal D of the D flip-flop 42. An output from the output terminal $\overline{Q}$ of the D flip-flop is supplied to the other input terminal of the AND circuit 47 to determine a logical product with the above-mentioned system clock CLK and the result is supplied as a signal CPU-CLK to the microprocessor 34.

The control processing of the electronic apparatus of the embodiment which is configured as described above will now be explained with reference to the timing chart of FIG. 19.

Figure 19:
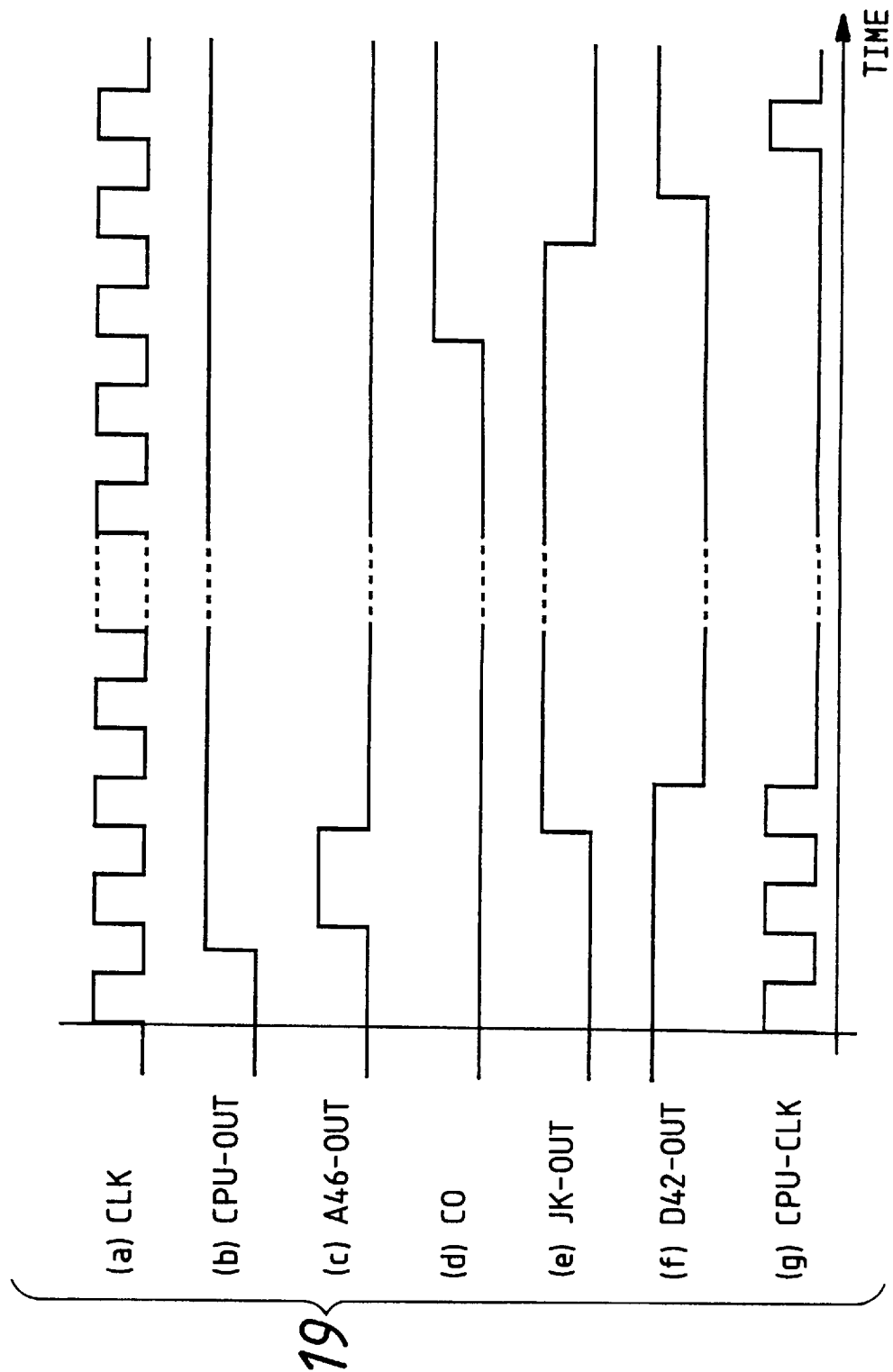
FIG. 19 is a timing chart which shows the operation timings of the clock controller of FIG. 17.

FIG. 19 is the timing chart which shows the operation timings of the clock controller 36 of FIG. 17. From the top, the signals in the timing chart are the system clock CLK (a), CPU-OUT (b) which is the output signal from the microprocessor 34, A46-OUT (c) which is the output signal of the AND circuit 46, CO (d) which is the carry output of the down counter 43, JK-OUT (e) which is the output of the JK flip-flop 45, D42-OUT (f) which is the output of the D flip-flop 42, and CPU-CLK (g) which is the output of the AND circuit 47.

Normally, the system clock CLK, when it is generated by the clock generator 35, it passes through the clock controller 36 while maintaining a waveform thereof and it is supplied to the microprocessor 34. This state is maintained also in the initialization by the system reset signal RS.

The microprocessor 34 first sends an ON signal to the controller 33 to turn the peak load device 32 ON. It is assumed that this signal has been issued at the timing shown by the CPU-OUT of (b) in FIG. 19. The clock controller 36 monitors this signal CPU-OUT, and the signal CPU-OUT is formed into a single shot through the D flip-flop 41 and the AND circuit 46 of FIG. 18 before it is output from the AND circuit 46 (A46-OUT of (c) in FIG. 19). This signal A46-OUT sets the JK flip-flop 45 and loads a set value of the register 44, namely, a time for stopping the system clock CLK, into the down counter 43. The set value of the register 44 is a value of a time which is longer than the time during which large current flows through the peak load device 32.

When the down counter 43 completes counting down the loaded set value, it issues the carry signal through the output terminal CO to reset the JK flip-flop 45. Hence, the output JK-OUT of the JK flip-flop 45 goes high upon the fall of a pulse of the signal A46-OUT and goes low after the carry output signal CO subsequently rises and one clock of the system clock CLK is issued. Then, after the output signal JK-OUT falls, the D flip-flop 42 issues "high" through the output terminal $\overline{Q}$ in synchronization of the fall of the system clock CLK. The synchronization with the fall of the system clock CLK prevents the occurrence of hazards. Thus, the output CPU-OUT of the AND circuit 47 stops the output of a clock while "low" is being issued through the output terminal $\overline{Q}$ of the D flip-flop 42, that is, while large current is flowing through the peak load device 32. This makes it possible to prevent malfunction of the microprocessor 34, which is caused by a voltage drop due to the peak load device 32.

As another example of the control processing of the embodiment, there is control processing wherein a time, which is shorter than the time during which large current flows, is set in the register 44, and the signal CPU-OUT is rendered high again through the microprocessor 34 because the large current will be still flowing after the down counter 43 completes counting. By so doing, the CPU-CLK output is supplied each time the down counter 43 finishes counting, allowing the same control processing as clock division. In this case, by shortening the operating time of the microprocessor 34 per processing, a drop in the line voltage of the microprocessor 34 can be prevented by the function of an electrolytic capacitor which is normally installed in the power line of the microprocessor 34. In addition, carrying out the control processing prevents the microprocessor 34 from being completely stopped, thus allowing other processing such as a short interrupt to be performed.

Figure 20:
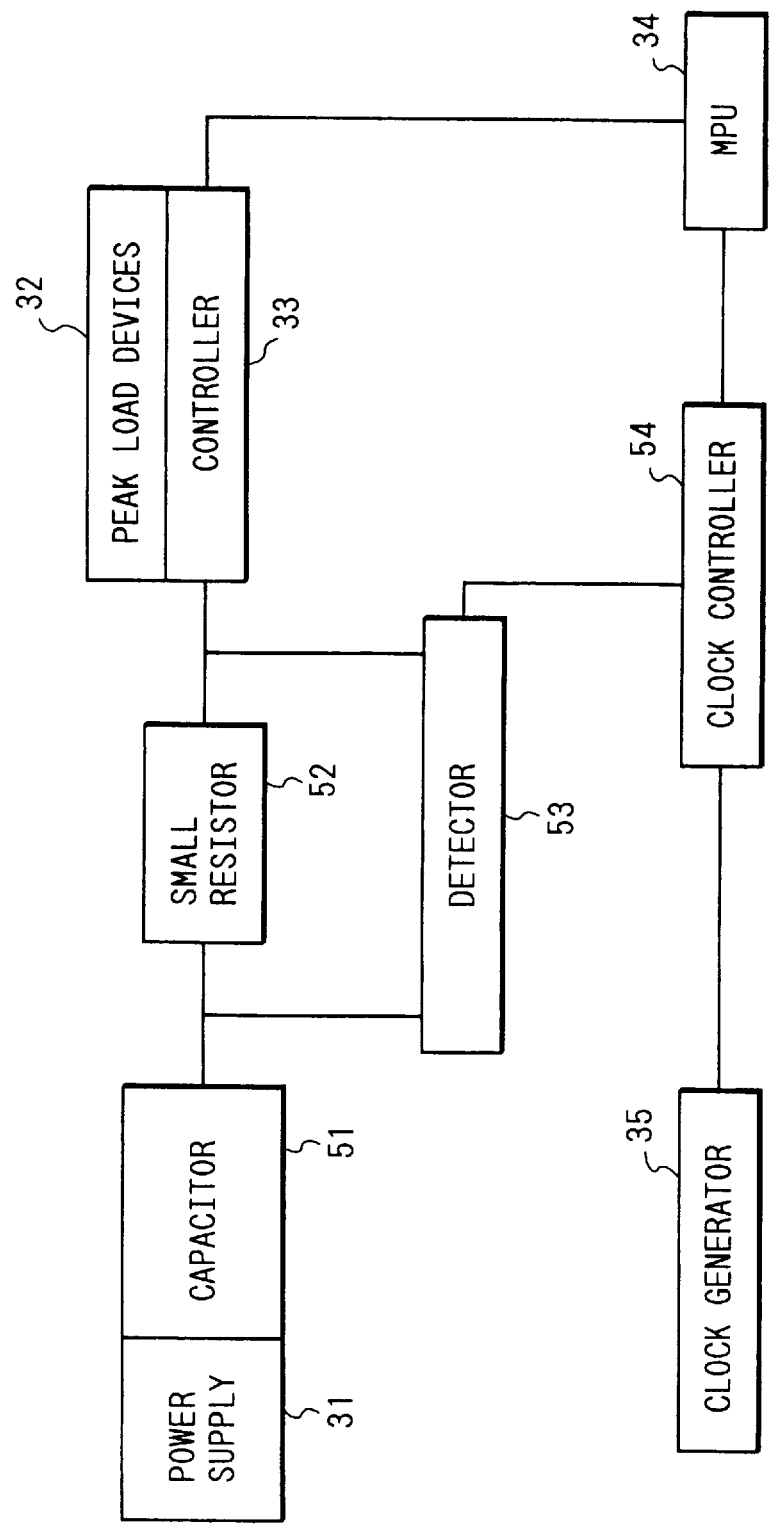
FIG. 20 is a block diagram which shows a schematic configuration of the sixth embodiment of the electronic apparatus according to the present invention.

FIG. 20 is the block diagram which shows the schematic configuration of the sixth embodiment of the electronic apparatus according to the present invention.

This embodiment differs from the fifth embodiment described above only in that a circuit, which has a minute resistor and a detector connected in parallel, is inserted between the power supply 31 and the controller 33 and the internal configuration of the clock controller is different. Hence, the elements in FIG. 20 which correspond to those in FIG. 17 will be given the same reference numerals and detailed explanation thereof will be omitted.

In FIG. 20, the electronic apparatus of the embodiment has an electrolytic capacitor 51 connected to the output side of the power supply 31, the output side of the electrolytic capacitor 51 being connected to a minute resistor 52, which is a detector for detecting current flowing through the peak load device 32, and the input side of a detector 53, which detects the voltage values across the minute resistor 52, and the output sides of the minute resistor 52 and the detector 53 being connected to the input side of the controller 33. Further, the detector 53 is connected to a clock controller 54.

Figure 21:
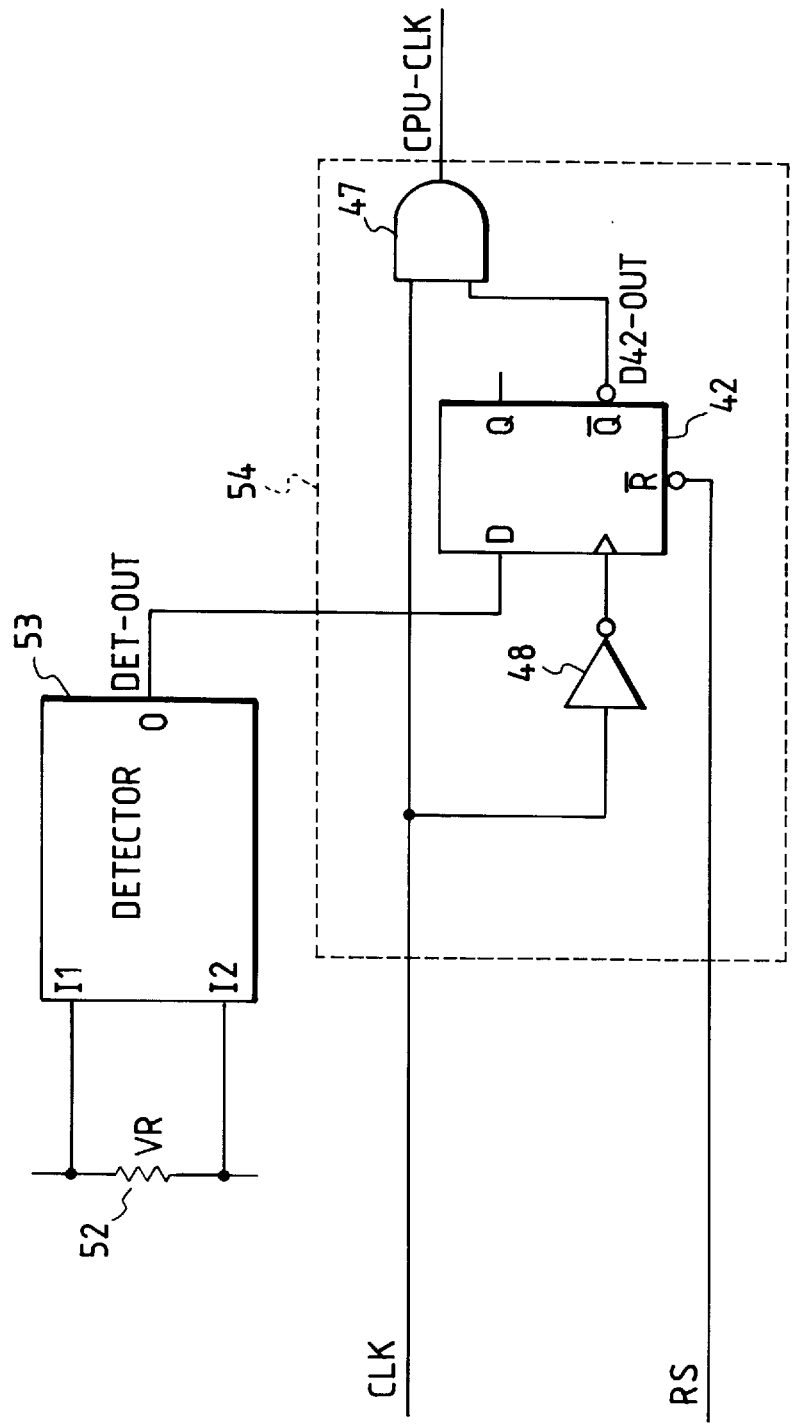
FIG. 21 is a block diagram which shows a detailed configuration of a clock controller of FIG. 20.

FIG. 21 is the block diagram which shows the detailed configuration of the clock controller 54 of FIG. 20. In the drawing, the clock controller 54 consists only of the D flip-flop 42 and the AND circuit 47, and the inverter 48 of FIG. 18, and the relationship of the connection between these elements is also the same as the relationship of the connection of the corresponding elements of FIG. 18. The controller 33 side of the minute resistor 52 is connected to an input terminal I1 of the detector 53, while the electrolytic capacitor 51 side of the minute resistor 52 is connected to an input terminal I2 of the detector 53. An output terminal O of the detector 53 is connected to the input terminal D of the D flip-flop 42.

The control processing of the electronic apparatus of the embodiment which is configured as described above will now be explained with reference to the timing chart of FIG. 22.

Figure 22:
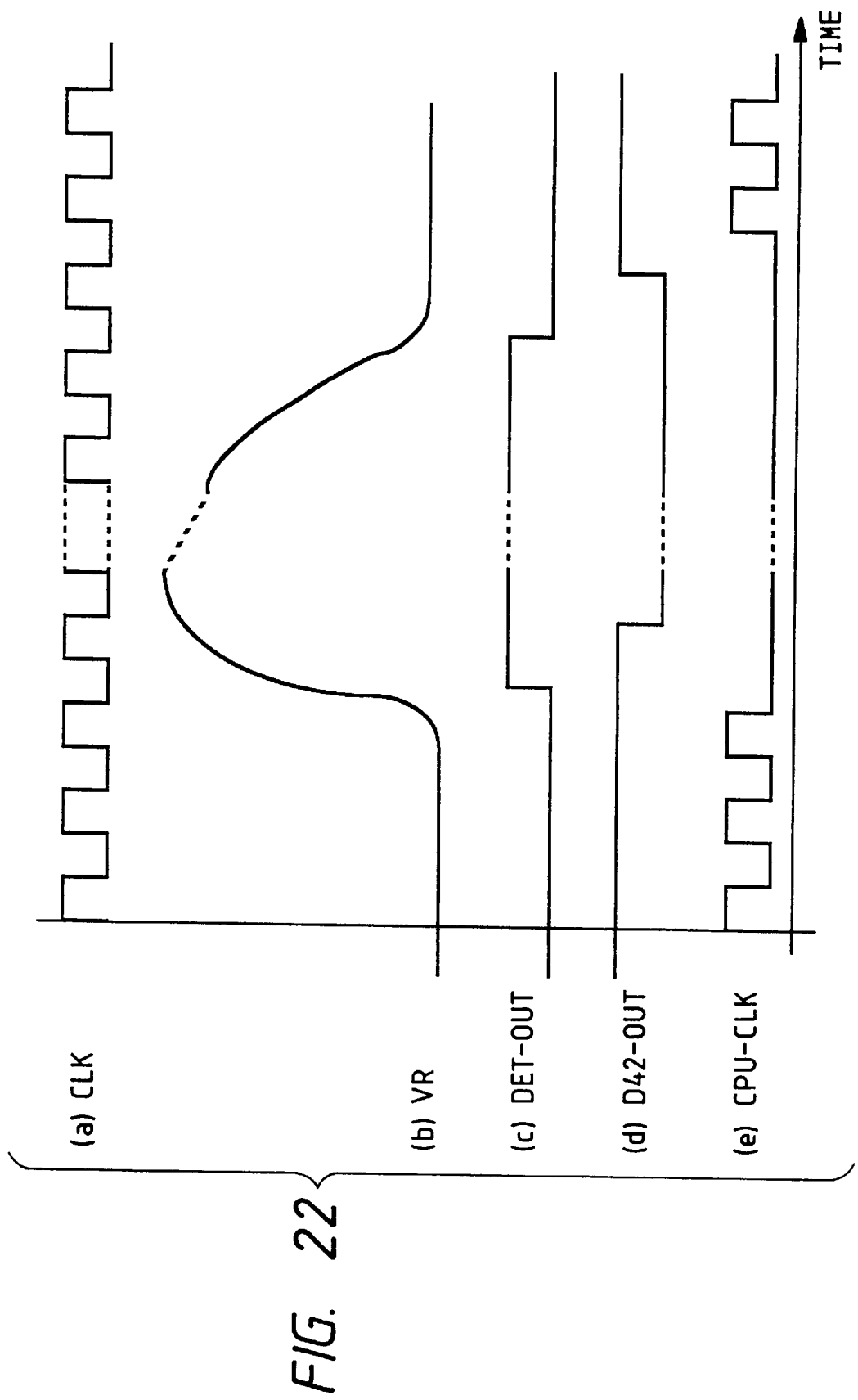
FIG. 22 is a timing chart which shows the operation timings of a clock controller of FIG. 21.
Figure 23:
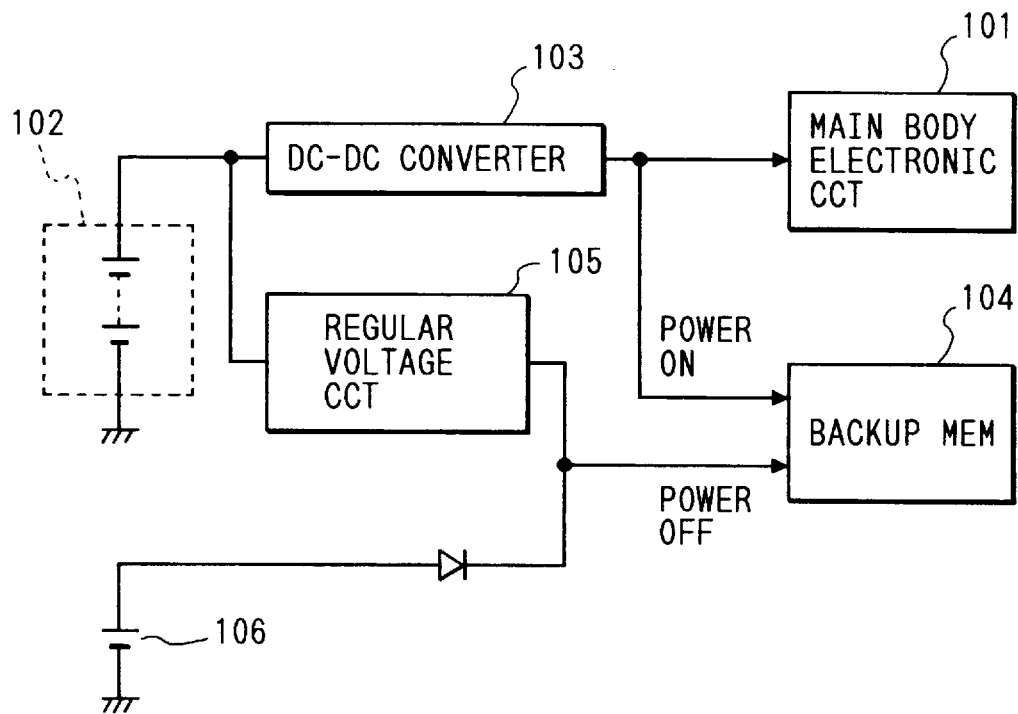
FIG. 23 is a block diagram which shows a schematic configuration of the conventional electronic apparatus provided with a backup memory.
Figure 24:
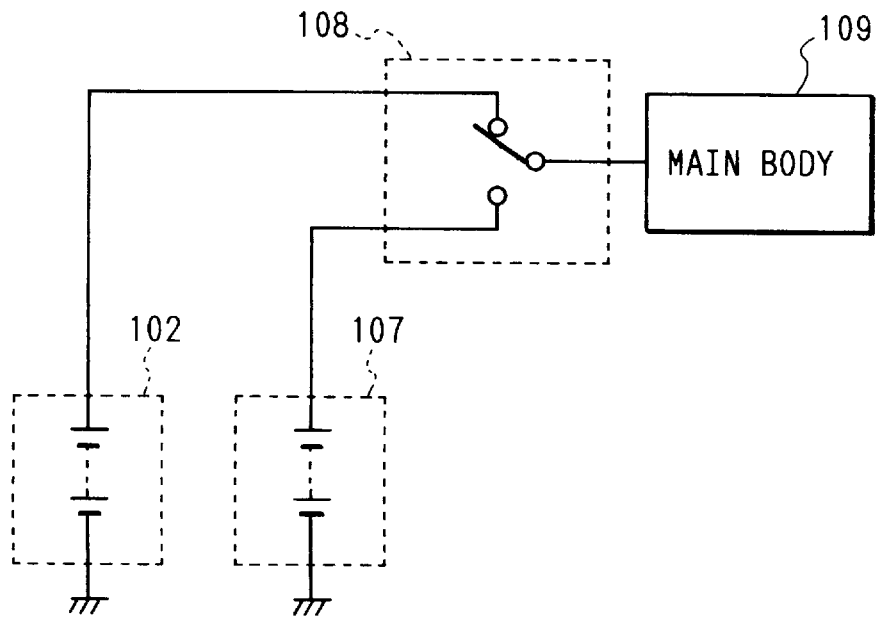
FIG. 24 is a block diagram which shows a schematic configuration of another example of the conventional electronic apparatus.
Figure 25:
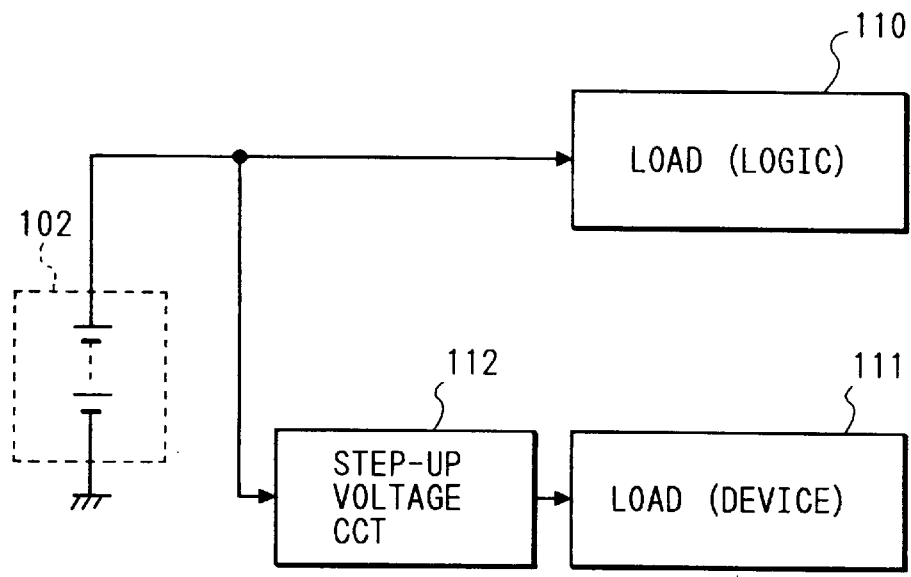
FIG. 25 is a block diagram which shows a schematic configuration of still another example of the conventional electronic apparatus.
Figure 26:
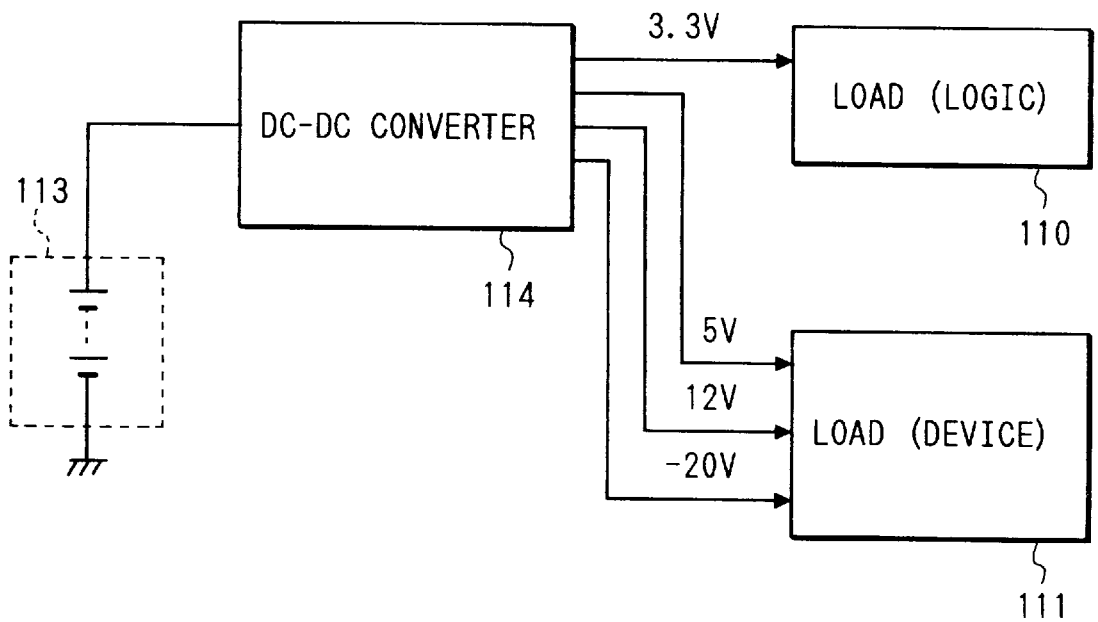
FIG. 26 is a block diagram which shows a schematic configuration of yet another example of the conventional electronic apparatus.

FIG. 22 is the timing chart which shows the operation timings of the clock controller 54 of FIG. 21. From the top, the signals in the timing chart are the system clock CLK (a), VR (b), the voltage on both ends, which has been obtained by converting the current flowing through the minute resistor 52, DET-OUT (c) which is the output of the detector 53, D42-OUT (d) which is the output of the D flip-flop 42, and CPU-CLK (e) which is the output of the AND circuit 47.

As in the case of the fifth embodiment described above, normally, the system clock CLK, when it is generated by the clock generator 35, it passes through the clock controller 36 while maintaining a waveform thereof and it is supplied to the microprocessor 34. This state is maintained also in the initialization by the system reset signal RS.

The microprocessor 34 first sends the ON signal to the controller 33 to turn the peak load device 32 ON.

This causes large current to start flowing into the peak load device 32 from the electrolytic capacitor 51. At this time, there is a certain time before the electrolytic capacitor 51 causes the large current to begin flowing from the power supply 31. During that time, the system clock CLK is halted by the following control processing.

As mentioned above, the signal, which has been obtained by converting the aforesaid large current into a voltage by means of the minute resistor 52, is a signal VR in FIG. 22. The voltage momentarily increases, then becomes a steady-state voltage. This voltage is converted into a digital value by the detector 53 and supplied as a signal DET-OUT to the input terminal D of the D flip-flop 42. In the D flip-flop 42, the signal DET-OUT is inverted and output in synchronization with the system clock CLK and supplied as the signal D42-OUT to one input terminal of the AND circuit 47. The AND circuit 47 determines the logical product of the signal D42-OUT and the system clock CLK and supplies the result as the signal CPU-CLK (CPU-CLK of (e) in FIG. 22) to the microprocessor 34. The synchronization with the fall of the system clock CLK prevents the occurrence of hazards.

Thus, in this embodiment also, as in the case of the fifth embodiment described above, the output CPU-OUT of the AND circuit 47 halts the output of the clock while the "low" is being issued through the output terminal $\overline{Q}$ of the D flip-flop 42, that is, while the large current is flowing through the peak load device 32.

As described above, in the fifth and sixth embodiments, the system clock (CPU-CLK) supplied to the microprocessor 34 is suspended while there is a voltage drop due to the peak load, making it possible to prevent the microprocessor 34 from malfunctioning.

As explained above, according to the present invention, the electronic apparatus, wherein a plurality of loads are separately driven by a plurality of batteries, has a means which automatically switches the system of the connection between the batteries and the loads in accordance with the conditions of the electronic apparatus, providing such advantages as higher operating efficiency of the batteries due to a higher degree of freedom of the use of the plurality of batteries and reduced power consumption.

Furthermore, an electronic apparatus provided with a system clock generating means, which generates a system clock, and a peak load device, which has a steep load characteristic (peak load characteristic), has a system clock control means, which suspends the supply of the system clock produced by the system clock generating means or divides the system clock while the peak load device is generating a peak voltage, making it possible to use batteries of smaller capacities, leading to reduced cost and a reduced size of the apparatus and also to eliminate the influences such as malfunction caused by the peak load.

What is claimed is:

1. An electronic apparatus comprising a plurality of loads, which are separately driven at respective different voltages by a plurality of batteries, further comprises switching means which automatically changes a system of connection between the batteries and the loads in accordance with an operating mode established based on conditions of the electronic apparatus.

2. An electronic apparatus according to claim 1, wherein the conditions of the electronic apparatus are remaining capacities of said batteries.

3. An electronic apparatus according to claim 1, wherein the conditions of the electronic apparatus are load changes in said loads.

4. An electronic apparatus according to claim 1, wherein the conditions of the electronic apparatus are temperature changes in the electronic apparatus.

5. A drive controller for an electronic apparatus which has first and second loads driven at respective different voltages, said drive controller comprising first and second batteries, which drive said electronic apparatus, a detecting means, which detects remaining capacities of said first and second batteries, and a changing means, which changes a connecting route of said first and second batteries to said first and second loads of the electronic apparatus in accordance with a detection result given by said detecting means.

6. A drive controller for an electronic apparatus according to claim 5, wherein said first and second batteries are connected in series if the voltages of said first and second batteries are lower than the lowest drive voltage of said electronic apparatus.

7. A power supply control apparatus comprising:
a battery;
detection means for detecting an output voltage of said battery;
generating means for generating a voltage in response to the output voltage of said battery;
connection means for connecting said battery to a load; and
control means for controlling said connection means to connect said battery to the load via said generating means when said detection means detects that the output voltage of said battery is higher than a first value or lower than a second value and to connect said battery directly to the load when said detection means detects that the output voltage of said battery is lower than or equal to the first value or higher than or equal to the second value.

8. An apparatus according to claim 7, further comprising an additional battery and an additional generating means for generating a another voltage in response to an output voltage of said additional battery, wherein said control means controls connection such that said additional battery is connected to another load via said additional generating means.

9. An apparatus according to claim 8, wherein the first value is larger than the second value.

10. An apparatus according to claim 9, wherein said generating means decreases or increases its input voltage to generate the voltage, and said additional generating means increases its input voltage to generate the another voltage.

11. An apparatus according to claim 8, further comprising additional detection means for detecting an output voltage of said additional battery, wherein said control means controls to connect said battery and said additional battery in series to the load when said detection means and said additional detection means detect that the output voltages of said battery and said additional battery are both lower than the second value.

12. A method of operating an electronic apparatus comprising a plurality of loads, which are separately driven at respective different voltages by a plurality of batteries, comprising a switching step, for automatically changing a system of connection between the batteries and the loads in accordance with an operating mode established based on conditions of the electronic apparatus.

13. A method according to claim 12, wherein the conditions of the electronic apparatus are remaining capacities of the batteries.

14. A method according to claim 12, wherein the conditions of the electronic apparatus are load changes in the loads.

15. A method according to claim 12, wherein the conditions of the electronic apparatus are temperature changes in the electronic apparatus.

16. A method of operating a drive controller for an electronic apparatus which has first and second loads driven at respective different voltages by first and second batteries of the drive controller, comprising the steps of (1) detecting remaining capacities of the first and second batteries, and (2) changing a connecting route of the first and second batteries to the first and second loads of the electronic apparatus in accordance with a detection result given by said detecting step.

17. A method according to claim 16, wherein said changing step includes connecting the first and second batteries in series if the voltages of the first and second batteries are lower than the lowest drive voltage of the electronic apparatus.

18. A method of operating a power supply control apparatus which has a battery, comprising the steps of:

detecting an output voltage of the battery;

generating a voltage in response to the output voltage of the battery, using a generating means;

connecting the battery to a load; and controlling said connecting step, to connect the battery to the load via the generating means when said detecting step detects that the output voltage of the battery is higher than a first value or lower than a second value and to connect the battery directly to the load when said detecting step detects that the output voltage of the battery is lower than or equal the first value or higher than or equal to the second value.

19. A method according to claim 18, further comprising the step of using an additional battery and an additional generating means for generating another voltage in response to an output voltage of the additional battery, wherein said controlling step includes controlling the connecting step such that the additional battery is connected to another load via the additional generating means.

20. A method according to claim 19, wherein the first value is larger than the second value.

21. A method according to claim 20, wherein the generating means decreases or increases its input voltage to generate the voltage, and the additional generating means increases its input voltage to generate the another voltage.

22. A method according to claim 19, further comprising an additional detecting step of detecting an output voltage of the additional battery, wherein said controlling step includes controlling connecting the the battery and the additional battery in series to the load when said detecting step and said additional detecting step detect that the output voltages of the battery and the additional battery are both lower than the second value.

* * * * *

UNITED STATES PATENT AND TRADEMARK OFFICE
CERTIFICATE OF CORRECTION

PATENT NO.   : 5,814,972
DATED        : September 29, 1998
INVENTOR(S)  : Kazutoshi Shimada et al.

Page 1 of 1

It is certified that error appears in the above-identified patent and that said Letters Patent is hereby corrected as shown below:

Column 1,
Line 18, "apparatus," should read -- apparatus --.
Line 65, "voltage from the main battery 102, which voltage" should be deleted.
Line 66, "is" (first occurrence) should be deleted.

Column 3,
Line 6, "apparatus," should read -- apparatus --.

Column 8,
Line 15, "determines" should read -- determine --.

Column 16,
Line 23, "a another" should read -- another --.

Column 17,
Line 16, "equal" should read -- equal to --.

Column 18,
Line 14, "the the" should read -- the --.

Signed and Sealed this

Ninth Day of April, 2002

*Attest:*

*Attesting Officer*

JAMES E. ROGAN
*Director of the United States Patent and Trademark Office*